(12) United States Patent
Kuroda et al.

(10) Patent No.: US 7,584,312 B2
(45) Date of Patent: Sep. 1, 2009

(54) DATA PROCESSING APPARATUS HAVING IMPROVED BUFFER MANAGEMENT

(75) Inventors: Manabu Kuroda, Hyogo (JP); Osamu Furuya, Osaka (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 11/513,355

(22) Filed: Aug. 31, 2006

(65) Prior Publication Data

US 2007/0061600 A1  Mar. 15, 2007

(30) Foreign Application Priority Data

Aug. 31, 2005 (JP) ............................. 2005-251179
Aug. 22, 2006 (JP) ............................. 2006-225710

(51) Int. Cl.
G06F 3/00 (2006.01)
G06F 1/26 (2006.01)
G06F 1/00 (2006.01)

(52) U.S. Cl. .............................. 710/52; 710/29; 710/59; 713/320; 713/324

(58) Field of Classification Search ...................... 710/1, 710/29, 52, 57–60; 713/320, 323, 324
See application file for complete search history.

(56) References Cited

U.S. PATENT DOCUMENTS 6,401,149 B1 * 6/2002 Dennin et al. ................. 710/58
2002/0111199 A1   8/2002 Yano et al.
2006/0209684 A1 * 9/2006 Bei ............................ 370/229

FOREIGN PATENT DOCUMENTS

JP           1-93852 A      4/1989
JP        2004-320569 A    11/2004

* cited by examiner

*Primary Examiner*—Alford W Kindred
*Assistant Examiner*—Richard Franklin
(74) *Attorney, Agent, or Firm*—McDermott Will & Emery LLP

(57) ABSTRACT

A data processing apparatus stops a supply of data to a buffer when the buffer becomes full, and thereafter performs processing such as moving to a low-power mode and switching execution tasks. The data processing apparatus then reverts from the low-power mode and resumes execution of a task for supplying data to the buffer when a predetermined reversion condition is satisfied. The predetermined reversion condition is that, for example, processing with respect to data in a predetermined data cluster is completed, a predetermined time period has elapsed, or a cycle handler notifies an event occurrence.

18 Claims, 13 Drawing Sheets

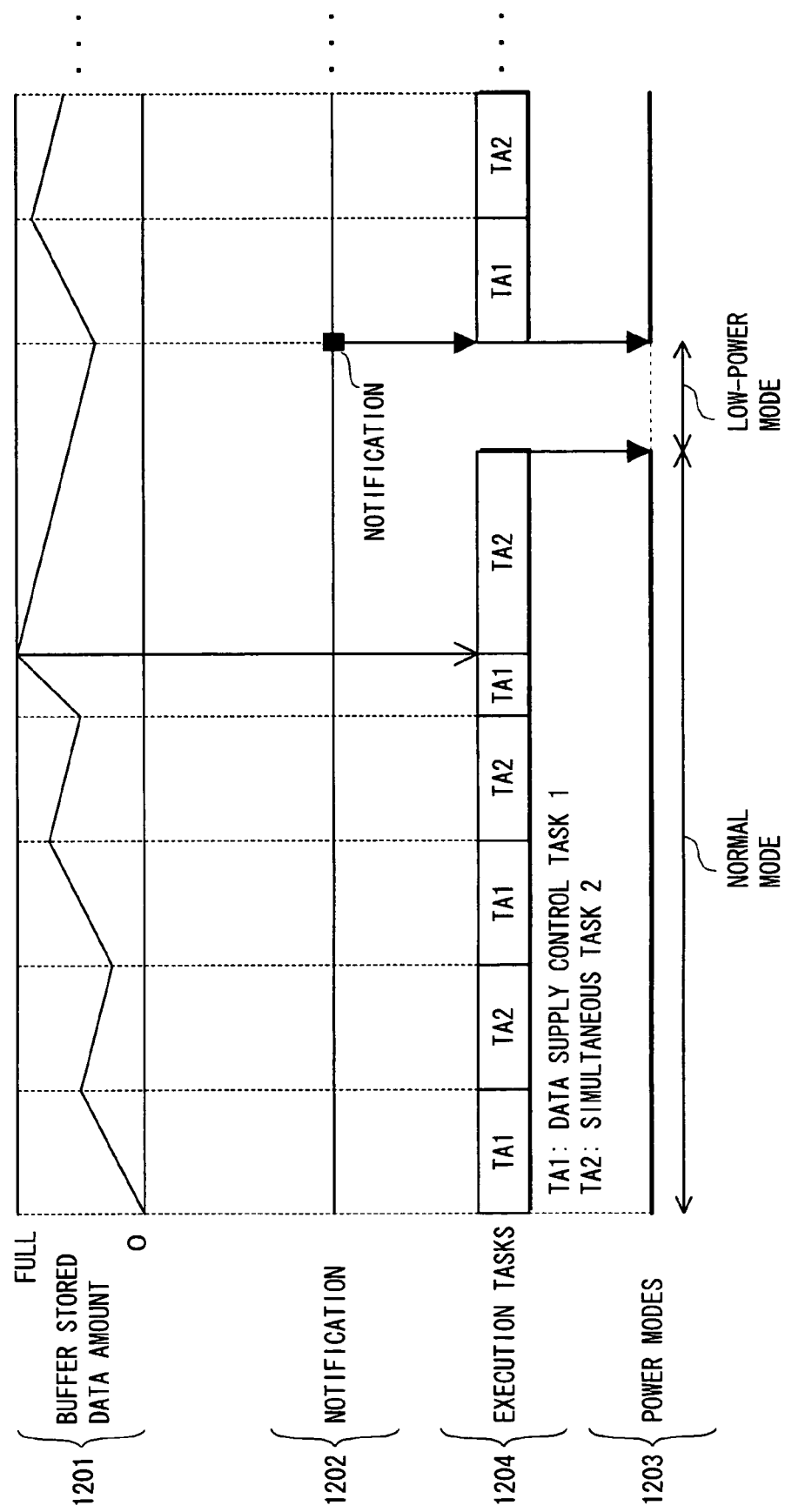

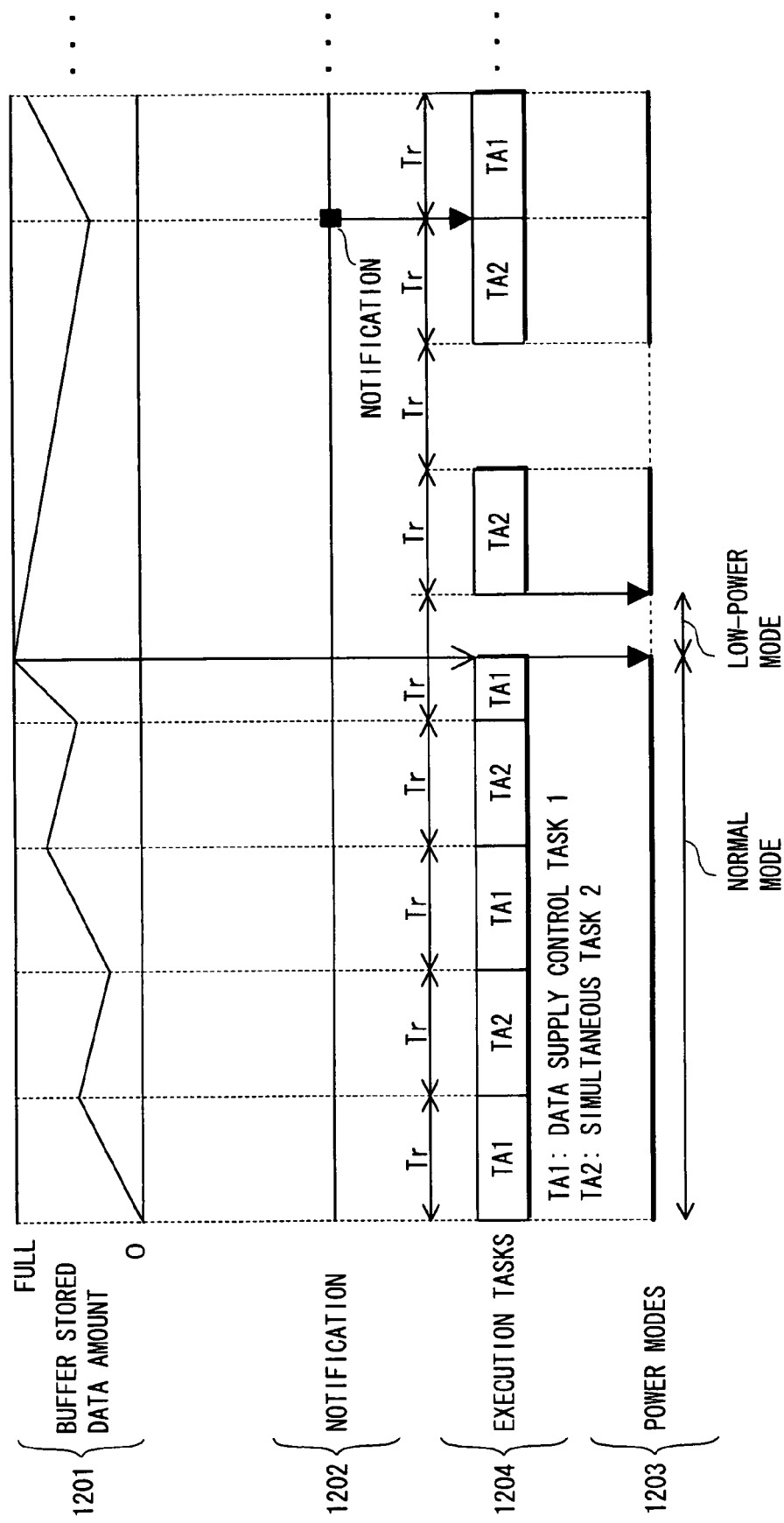

DATA PROCESSING APPARATUS HAVING IMPROVED BUFFER MANAGEMENT

This application is based on Patent Application Nos. 2006-225710 and 2005-251179 filed in Japan, the content of which is hereby incorporated by reference.

BACKGROUND OF INVENTION

1. Field of the Invention

The present invention relates to a data processing apparatus for reading data from a recording medium etc., supplying the read data to a buffer, reading the supplied data from the buffer, and processing the read data, and in particular to technology for controlling operations of the data processing apparatus while waiting for free space in the buffer.

2. Related Art

When data processing speeds and data transfer speeds vary between different devices, data processing apparatuses are widely used to absorb the difference in these speeds by supplying data to and reading data from a buffer.

In conventional data processing apparatuses, a free space status of the buffer is observed while controlling the supply of data to the buffer such that data not yet read from the buffer is not overwritten by newly supplied data.

Specifically, the data processing apparatus sequentially observes the buffer use status, and supplies data to the buffer until it is full. When the buffer becomes full, the data processing apparatus stops the supply of data. The data processing apparatus then resumes the supply of data as soon as space becomes available in the buffer.

Note that the following patent documents disclose a system that performs data transmission suppression (see Patent Document 1), and a system that controls the frequency of a read clock in accordance with a remaining buffer volume (see Patent Document 2).

Patent Document 1: Japanese Patent Application Publication No. H01-93852

Patent Document 2: Japanese Patent Application Publication No. 2004-320569

However, given that the above-mentioned conventional data processing apparatus suppresses the supply of data when the buffer becomes full, and resumes the supply of data when there is a free space in the buffer thereafter, there occurs a data transferability wait state from when the supply of data is suppressed until free space becomes available in the buffer. While in this wait state, data cannot be supplied to the buffer, and the data processing apparatus continues to unnecessarily perform processing for controlling the supply of data to the buffer.

SUMMARY OF INVENTION

An object of the present invention is to provide a data processing apparatus for resolving the above-mentioned issue.

In order to resolve the above issue, a data processing apparatus of the present invention includes a buffer; a data supply unit operable to supply data to the buffer; a processing execution unit operable to read the data from the buffer and execute processing; a buffer management unit operable to manage a stored data amount of the buffer; a supply control unit having a normal mode and a low-power mode as operation modes, and operable to, during the normal mode, control the data supply unit to supply the data to the buffer, according to the stored data amount of the buffer, and restrict the control during the low-power mode; and a power control unit operable to move the supply control unit from the normal mode to the low-power mode when the stored data amount of the buffer reaches a predetermined threshold, and after performing the move, revert the supply control unit from the low-power mode to the normal mode when a predetermined reversion condition is satisfied.

Here, "low-power mode" refers to an operation mode in which the data processing apparatus controls its functions and performance to operate with a lower power consumption than in the normal mode, by stopping or reducing a clock or voltage supplied to a portion of a circuit block, putting the processor in a sleep mode, lowering a supply voltage, and the like.

When an amount of data stored in the buffer reaches a predetermined threshold, the data processing apparatus having the above structure operates in the low-power mode which restricts processing for controlling the supply of data to the buffer.

For example, if assumed to operate in the low-power mode when the buffer becomes full, the data processing apparatus having the above structure can operate with a reduced power consumption after entering a data transferable wait state when the buffer is full.

Note that in general, data processing apparatuses sequentially read and consume data from a buffer in relatively small units of a few bits. For example, video and audio stream decoding processing involves the data processing apparatus reading compressed encoded data from the buffer to execute processing. This is because the compressed encoded data is read from the buffer in very small units. The buffer therefore becomes full in an extremely short period of time.

In the above structure, if the data processing apparatus controls the operation modes according to, for example, only whether the buffer is full, it is possible to predict a case in which the data processing apparatus moves to the low-power mode when the buffer becomes full and reverts to the normal mode for supplying data to the buffer as soon as free space becomes available. In this case, the operation modes of the data processing apparatus will switch frequently while the amount of data stored in the buffer is full or nearly full since the buffer will be completely full for only an extremely short period of time.

In general, reducing the power consumption of a data processing apparatus and reverting back to normal power consumption are accompanied by switching of hardware clocks and the like, thereby causing a large overhead. Power consumption increases and the processing performance of the data processing apparatus degrades when the operation modes of the data processing apparatus switch frequently, compared with the case of not performing power consumption control in a data transferable wait state. The effect of power consumption control may therefore not be realized.

Therefore, the predetermined reversion condition may be that the processing execution unit executes processing with respect to data in a predetermined data cluster.

Here, "data cluster" refers to data in a collective unit for data processing, and is a relatively large amount of data such as, for example, 128 bits. For example, in the case of the processing execution unit decoding video, the processing execution unit executing processing for data of a predetermined data cluster would involve executing processing for data in a data processing unit such as a frame unit, block unit, or GOP (Group Of Pictures) unit.

According to the above structure, after moving to the low-power mode, the data processing apparatus does not revert to the normal mode until the processing execution unit has performed processing for data in a predetermined data cluster.

The present invention can therefore suppress the frequency of operation mode switching to avoid an increase in overhead.

Note that the processing capacity required by the data processing apparatus may change according to the situation. For example, if decoding video, the data processing apparatus would require different processing capacities according to the bit rate of the video data. In other words, the amount of data to be processed in a predetermined time period in the processing execution unit rises as the bit rate increases. Given that the data to be processed is read from the buffer, the data consumption speed of the buffer rises as the bit rate increases.

While the data processing apparatus controls the operation modes in the data transferable wait state, it is possible for a buffer underflow to occur since restarting the supply of data to the buffer is delayed when reversion from the low-power mode is slow.

Therefore, the data processing apparatus may further include a target performance management unit operable to manage a processing capacity to be achieved by the processing execution unit, and control an amount of the data in the predetermined data cluster according to the processing capacity.

A data processing apparatus having the above structure controls the amount of data in the predetermined data cluster according to the required processing capacity.

It is therefore possible to, for example, shorten the interval between the low-power mode and the normal mode by further reducing the amount of data in the predetermined data cluster the higher the processing capacity required by the data processing apparatus becomes. According to this, power consumption can be controlled while ensuring stability for data processing such that a buffer underflow does not occur.

Also, the buffer management unit may include a lower-limit detection subunit operable to detect that the stored data amount of the buffer is less than or equal to a predetermined lower threshold, and the predetermined reversion condition may be that the lower-limit detection subunit performs the detection after the power control unit has performed the move.

According to this structure, the frequency of operation mode switching can be suppressed to avoid an increase in overhead.

Also, the data processing apparatus may further include a target performance management unit operable to manage a processing capacity to be achieved by the processing execution unit, and control a value of the predetermined lower threshold according to the processing capacity.

According to this structure, power consumption can be controlled while ensuring stability for data processing such that a buffer underflow does not occur.

Also, the predetermined reversion condition may be that a predetermined time period has elapsed after the power control unit has performed the move.

According to this structure, the frequency of operation mode switching can be suppressed to avoid an increase in overhead.

Also, the data processing apparatus may further include a target performance management unit operable to manage a processing capacity to be achieved by the processing execution unit, and control a value of the predetermined time period according to the processing capacity.

According to this structure, power consumption can be controlled while ensuring stability for data processing such that a buffer underflow does not occur.

Also, the data processing apparatus may further include a cyclic event occurrence unit operable to notify an event occurrence at a predetermined cycle, the predetermined reversion condition being that the cyclic event occurrence unit notifies the event occurrence after the power control unit has performed the move.

According to this structure, the frequency of operation mode switching can be suppressed to avoid an increase in overhead.

Also, the data processing apparatus may further include a target performance management unit operable to manage a processing capacity to be achieved by the processing execution unit, and control a length of the predetermined cycle according to the processing capacity.

According to this structure, power consumption can be controlled while ensuring stability for data processing such that a buffer underflow does not occur.

Also, the supply control unit may have a plurality of the low-power modes, each having a different power consumption, the data processing apparatus may further include a target performance management unit operable to manage a processing capacity to be achieved by the processing execution unit, and the power control unit may include a selection subunit operable to select one of the plurality of low-power modes according to the processing capacity, and moves the supply control unit to the low-power mode selected by the selection subunit.

Regarding "a plurality of the low-power modes, each having a different power consumption", it is assumed that the loss of time during reversion from the low-power mode to the normal mode increases as the power consumption during the low-power mode decreases.

According to the data processing apparatus having this structure, one of the low-power modes having different loss times during reversion is selected by the selection unit according to the required processing capacity. At this time, the interval between the low-power mode and reversion to the normal mode can be shortened by selecting one of the plurality of low-power modes with a smaller loss time during reversion as the processing capacity required by the data processing apparatus increases.

Therefore, power consumption can be controlled while ensuring stability for data processing such that a buffer underflow does not occur.

Also, the present invention is a data processing apparatus including: a buffer; a processing execution unit operable to read data from the buffer and execute processing; a buffer management unit operable to manage a stored data amount of the buffer; a task execution unit operable to execute one or more tasks including a data supply control task for controlling, according to the stored data amount of the buffer, processing for supplying the data to the buffer; and a task execution right control unit operable to stop execution of the data supply control task when the stored data amount of the buffer reaches a predetermined threshold while the data supply control task has been allocated a task execution right in the task execution unit, and after performing the stopping, control allocation of the task execution right such that the execution of the data supply control task is resumed when a predetermined resumption condition is satisfied.

The data processing apparatus having the above structure stops the execution of the data supply control task when the amount of data stored in the buffer reaches the predetermined threshold.

Here, the data processing apparatus stops execution of the data supply control task when, for example, the buffer becomes full. When the buffer becomes full and the data processing apparatus is in the data transferable wait state in conventional structures, the processor is used to only repeatedly perform processing for judging whether the buffer is full.

In contrast, the data processing apparatus having the above structure stops the execution of the data supply control task while in the data transferable wait state, thereby enabling the processor to be used for other processing while the execution of the data supply control task is stopped. In other words, it is possible to improve the operating efficiency of the data processing apparatus.

Also, the task execution right control unit may along with stopping the execution of the data supply control task, transfer the task execution right that was allocated to the data supply control task to a simultaneous task for performing processing other than for supplying the data to the buffer, and after performing the stopping, control the allocation of the task execution right by allocating the task execution right to the data supply control task when the predetermined resumption condition is satisfied.

According to this structure, the operating efficiency of the data processing apparatus can be improved since it is possible to, for example, cause the data processing apparatus to execute a task for performing processing other than supplying data to the buffer, while in the data transferable wait state.

Also, the data processing apparatus, being able to operate in a plurality of operation modes having respectively differing power consumptions, may further include a normal mode and a low-power mode as the operation modes; and a power control unit operable to move the data processing apparatus from the normal mode to the low-power mode when none of the one or more tasks to be executed are present in the task execution unit or all of the one or more tasks are in an execution wait state after the task execution right control unit has performed the transfer, and after performing the move, revert the data processing apparatus from the low-power mode to the normal mode when the predetermined resumption condition is satisfied.

Also, the predetermined resumption condition may be that any of the one or more tasks becomes executable after the power control unit has performed the move.

The data processing apparatus having the above structure can reduce power consumption by operating in the low-power mode while it is unnecessary to operate the processor.

Also, the data processing apparatus may further include a plurality of the low-power modes, each having a different power consumption; and a target performance management unit operable to manage a processing capacity to be achieved by the processing execution unit, the power control unit including a selection subunit operable to select one of the plurality of low-power modes according to the processing capacity, and the power control unit moving the data processing apparatus to the low-power mode selected by the selection subunit.

According to this structure, power consumption can be controlled while ensuring stability for data processing such that a buffer underflow does not occur.

Also, the data processing apparatus, being able to operate in a plurality of operation modes having respectively differing power consumptions, may further include a normal mode and a low-power mode as the operation modes, the task execution unit allocating the task execution right to the one or more tasks, and executing the one or more tasks by a round-robin method, and the data processing apparatus further including a power control unit operable to cause the data processing apparatus to operate in the low-power mode in a time slot of the data supply control task while the execution thereof has been stopped by the task execution right control unit.

The data processing apparatus having the above structure executes tasks using the round-robin method, and, after stopping the execution of the data supply control task, moves to the low-power mode in the time slot for the data supply control task.

It is therefore possible to reduce the power consumption of the data processing apparatus, as well as prevent tasks other than the data supply control task from being executed excessively, and ensure stability of operations of the data processing apparatus.

Also, the data processing apparatus may further include a plurality of the low-power modes, each having a different power consumption; and a target performance management unit operable to manage a processing capacity to be achieved by the processing execution unit, the power control unit including a selection subunit operable to select one of the plurality of low-power modes according to the processing capacity, and the power control unit causing the data processing apparatus to operate in the low-power mode selected by the selection subunit, in the time slot.

According to this structure, power consumption can be controlled while ensuring stability for data processing such that a buffer underflow does not occur.

Also, the predetermined resumption condition may be that the processing execution unit executes processing with respect to data in a predetermined data cluster.

According to this structure, the frequency of operation mode switching can be suppressed to avoid an increase in overhead.

Also, the data processing apparatus may further include a target performance management unit operable to manage a processing capacity to be achieved by the processing execution unit, and control an amount of the data in the predetermined data cluster according to the processing capacity.

According to this structure, power consumption can be controlled while ensuring stability for data processing such that a buffer underflow does not occur.

Also, the buffer management unit may include a lower-limit detection subunit operable to detect that the stored data amount of the buffer is below a predetermined lower threshold, and the predetermined resumption condition may be that the lower-limit detection subunit performs the detection after the task execution right control unit has performed the stopping.

According to this structure, the frequency of operation mode switching can be suppressed to avoid an increase in overhead.

Also, the data processing apparatus may further include a target performance management unit operable to manage a processing capacity to be achieved by the processing execution unit, and control a value of the predetermined lower threshold according to the processing capacity.

According to this structure, power consumption can be controlled while ensuring stability for data processing such that a buffer underflow does not occur.

Also, the predetermined resumption condition may be that a predetermined time period has elapsed after the task execution right control unit has performed the stopping.

According to this structure, the frequency of operation mode switching can be suppressed to avoid an increase in overhead.

Also, the data processing apparatus may further include a target performance management unit operable to manage a processing capacity to be achieved by the processing execution unit, and control a value of the predetermined time period according to the processing capacity.

According to this structure, power consumption can be controlled while ensuring stability for data processing such that a buffer underflow does not occur.

Also, the data processing apparatus may further include a cyclic event occurrence unit operable to notify an event occurrence at a predetermined cycle, the predetermined resumption condition being that the cyclic event occurrence unit notifies the event occurrence after the task execution right control unit has performed the stopping.

According to this structure, the frequency of operation mode switching can be suppressed to avoid an increase in overhead.

Also, the data processing apparatus may further include a target performance management unit operable to manage a processing capacity to be achieved by the processing execution unit, and control a length of the predetermined cycle according to the processing capacity.

According to this structure, power consumption can be controlled while ensuring stability for data processing such that a buffer underflow does not occur.

Also, the present invention is a content playback apparatus for sequentially reading data of digital content that is recorded on a recording medium and is playable by performing predetermined decoding processing, and for playing back the read data, the content playback apparatus including: a buffer; a data supply unit operable to sequentially-read the data of the digital content from the recording medium, and supply the read data to the buffer; a decoder operable to sequentially read the data from the buffer, and decode the read data; a playback processing unit operable to playback the decoded data; a remaining amount observing unit operable to manage a stored data amount of the buffer; a data supply control unit having a normal mode and a low-power mode as operation modes, and operable to during the normal mode, control the supply of the data to the buffer, according to whether the stored data amount of the buffer has reached a predetermined threshold, and restrict functions for the control while operating in the low-power mode; and a data supply control mode control unit operable to move the data supply control unit from the normal mode to the low-power mode when the stored data amount of the buffer reaches a predetermined threshold, and after performing the move, revert the data supply control unit from the low-power mode to the normal mode when a predetermined reversion condition is satisfied.

According to this structure, the data processing apparatus can operate with lower power consumption than in conventional structures.

Also, the present invention is a computer-readable control program for supplying data to a buffer included in a data processing apparatus that can operate in a normal mode and a low-power mode as operation modes, and when operating in the low-power-mode restricts processing for controlling a supply of data to the buffer according to a stored data amount of the buffer, and for causing the data processing apparatus to execute processing using the data supplied to the buffer, the control program including: a processing execution step of reading the data from the buffer and executing processing; a buffer management step of managing the stored data amount of the buffer; a supply control step of controlling the supply of data to the buffer according to the stored data amount of the buffer; and a power control step of moving the data processing apparatus from the normal mode to the low-power mode when the stored data amount of the buffer reaches a predetermined threshold, and after performing the move, reverting the data processing apparatus from the low-power mode to the normal mode when a predetermined reversion condition is satisfied.

Also, the present invention is a recording medium having recorded thereon a computer-readable control program for supplying data to a buffer included in a data processing apparatus that can operate in a normal mode and a low-power mode as operation modes, and when operating in the low-power mode restricts processing for controlling a supply of data to the buffer according to a stored data amount of the buffer, and for causing the data processing apparatus to execute processing using the data supplied to the buffer, the control program including: a processing execution step of reading the data from the buffer and executing processing; a buffer management step of managing the stored data amount of the buffer; a supply control step of controlling the supply of data to the buffer according to the stored data amount of the buffer; and a power control step of moving the data processing apparatus from the normal mode to the low-power mode when the stored data amount of the buffer reaches a predetermined threshold, and after performing the move, reverting the data processing apparatus from the low-power mode to the normal mode when a predetermined reversion condition is satisfied.

Also, the present invention is a computer-readable control program for supplying data to a buffer included in a data processing apparatus, and causing the data processing apparatus to execute processing using the data supplied to the buffer, the control program including: a processing execution step of reading data from the buffer and executing processing; a buffer management step of managing a stored data amount of the buffer; a task execution step of executing one or more tasks including a data supply control task for controlling, according to the stored data amount of the buffer, processing for supplying the data to the buffer; and a task execution right control step of stopping execution of the data supply control task when the stored data amount of the buffer reaches a predetermined threshold while the data supply control task has been allocated a task execution right in the task execution step, and after performing the stopping, controlling allocation of the task execution right such that the execution of the data supply control task is resumed when a predetermined resumption condition is satisfied.

Also, the present invention is a recording medium having recorded thereon a computer-readable control program for supplying data to a buffer included in a data processing apparatus, and causing the data processing apparatus to execute processing using the data supplied to the buffer, the control program including: a processing execution step of reading data from the buffer and executing processing; a buffer management step of managing a stored data amount of the buffer; a task execution step of executing one or more tasks including a data supply control task for controlling, according to the stored data amount of the buffer, processing for supplying the data to the buffer; and a task execution right control step of stopping execution of the data supply control task when the stored data amount of the buffer reaches a predetermined threshold while the data supply control task has been allocated a task execution right in the task execution step, and after performing the stopping, controlling allocation of the task execution right such that the execution of the data supply control task is resumed when a predetermined resumption condition is satisfied.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 12 shows transitions between tasks executed by a data supply control unit 205; and FIG. 13 shows operations of the data processing apparatus 2000.

DETAILED DESCRIPTION OF PREFERRED EMBODIMENTS

First Embodiment

An embodiment of a data processing apparatus pertaining to the present invention is described below.

In the present embodiment, the description illustrates an exemplary case in which the data processing apparatus is an audio playback device.

1.1 Structure

Figure 1:
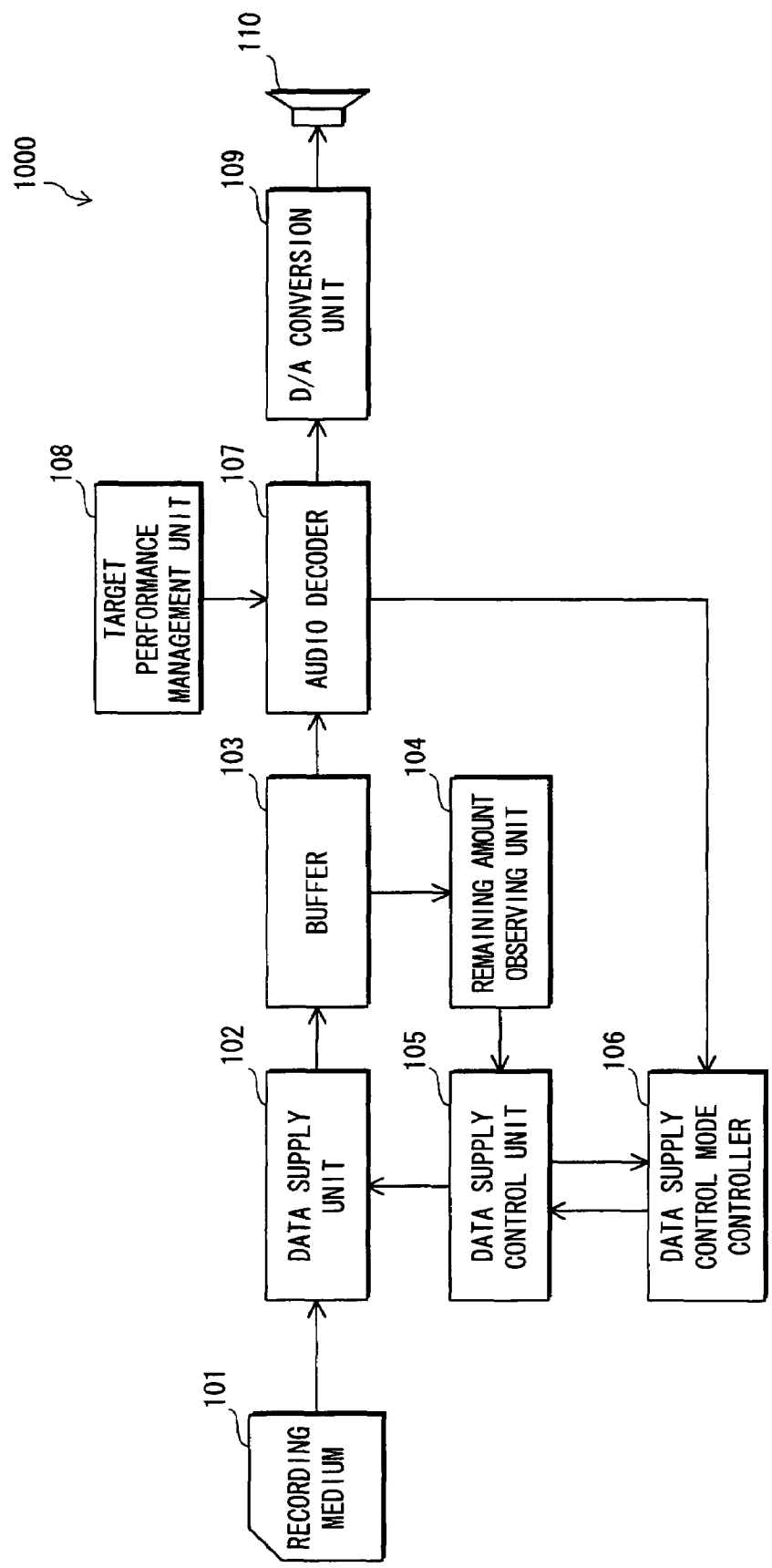
FIG. 1 is a functional block diagram showing a data processing apparatus 1000 according to a first embodiment of the present invention.

FIG. 1 is a functional block diagram showing a data processing apparatus 1000 pertaining to the first embodiment of the present invention.

A recording medium 101 is a recording medium able to store digital data, such as an SD (Secure Digital) memory card, flash memory, DVD-Audio, or the like. Recorded on the recording medium 101 is audio data etc. that has been compressed using a predetermined method such as AAC (Advanced Audio Coding) or MP3 (MPEG Audio Layer-3).

A data supply unit 102 reads the audio data recorded on the recording medium 101, and supplies the read audio data to a buffer 103.

The buffer 103 is a memory for storing the audio data supplied from the data supply unit 102.

A remaining amount observing unit 104 monitors an amount of audio data stored in the buffer 103, and sequentially outputs information regarding the amount of stored audio data to a data supply control unit 105.

The data supply control unit 105 receives, from the remaining amount observing unit 104, the information regarding the amount of audio data stored in the buffer 103, and, according to the stored audio data amount, controls the execution of the supply of audio data to the buffer 103 by the data supply unit 102. Specifically, in the present embodiment, the data supply control unit 105 causes the data supply unit 102 to supply audio data to the buffer 103 until the buffer 103 is full, in accordance with the information regarding the stored audio data amount, which is sequentially output from the remaining amount observing unit 104. When the buffer 103 becomes full, the data supply control unit 105 causes the data supply unit 102 to stop supplying audio data. At this time, the data supply control unit 105 notifies a data supply control mode controller 106 that it has caused the data supply unit 102 to stop supplying audio data to the buffer 103. Thereafter, the data supply control unit 105 causes the data supply unit 102 to resume supplying audio data to the buffer 103 when audio data is read from the buffer 103 and free space becomes available.

The data supply control mode controller 106 controls operation modes of the data supply control unit 105 according to information notified from the data supply control unit 105 and an audio decoder 107.

Next is a description of the operation modes mentioned above. The data processing apparatus 1000 has a low-power mode of operation in which a predetermined method is used to restrict functions and/or performance of the data processing apparatus 1000, thereby suppressing power consumption.

The predetermined method for executing the low-power mode includes various methods such as lowering or stopping an operation clock frequency of the data supply control unit 105 etc., lowering or stopping a supply clock to a portion of circuitry, and lowering a power supply voltage.

Also, the function block for which the supply clock is lowered or stopped is, for example, the data supply control unit 105. Since there is no need for processing to supply data to the buffer 103 when the buffer 103 is in a full state, the data supply unit 102, the remaining amount observing unit 104 and the like may also be moved to the low-power mode. When moved to the low-power mode, the functions and performance of the data supply control unit 105 are restricted, and the data supply control unit 105 ceases to control the data supply unit 102.

The following continues the description of the function blocks of the data processing apparatus 1000.

The audio decoder 107 reads the audio data stored in the buffer 103, and decodes the read audio data. The audio decoder 107 then outputs the decoded data to a D/A conversion unit 109. Also, each time the audio decoder 107 decodes audio data in a predetermined data cluster, the audio decoder 107 notifies the data supply control mode controller 106 that it has executed such decoding. For example, the audio decoder 107 notifies the data supply control mode controller 106 each time it decodes audio data of a predetermined number of frames.

A target performance management unit 108 adjusts an amount of data to be decoded by the audio decoder 107 until the audio decoder 107 sends the notification to the data supply control mode controller 106, according to information such as a data rate of the audio data to be decoded in the audio decoder 107.

The D/A conversion unit 109, which is a D/A converter, converts data output from the audio decoder 107 into analog audio signals, and outputs the audio signals to a speaker 110.

The speaker 110 externally outputs the audio signals as sound.

The above-mentioned functional blocks are realized as a computer system composed of, specifically, a CPU (Central Processing Unit), a ROM (Read Only Memory), a RAM (Random Access Memory), a system LSI (Large Scale Integration), and the like.

1.2 Operations

Next is a description of operations of the data processing apparatus 1000.

Figure 2:
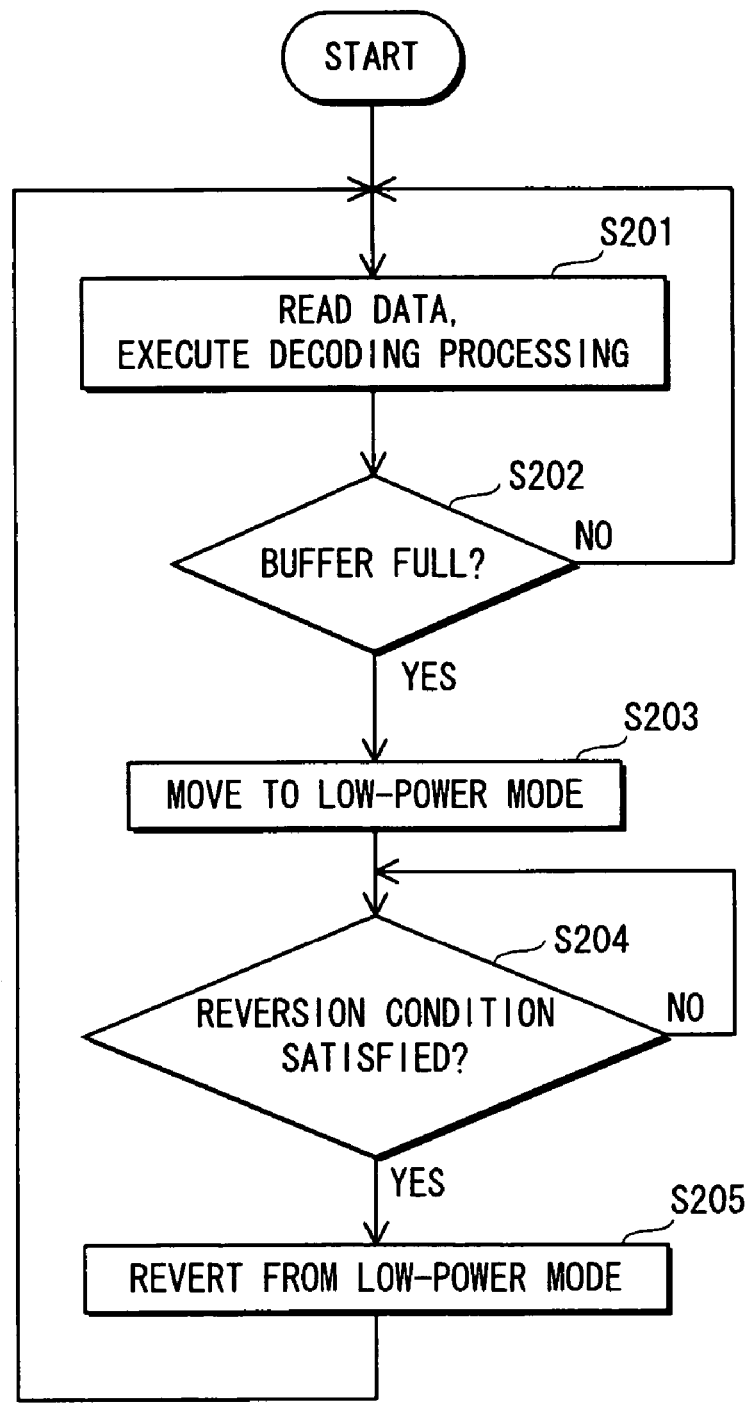
FIG. 2 is a flowchart showing operations of the data processing apparatus 1000.

FIG. 2 is a flowchart showing operations of the data processing apparatus 1000.

As shown in FIG. 2, the data supply unit 102 reads audio data from the recording medium 101, and supplies the read audio data to the buffer 103. Also, the audio decoder 107 sequentially reads the audio data supplied to the buffer 103, and executes decoding processing on the read audio data (step S201).

The data supply control unit 105 causes the data supply unit 102 to execute processing for supplying audio data to the buffer 103 (step S201), until the buffer 103 becomes full (step S202:NO). When the buffer 103 becomes full (step S202: YES), the data supply control unit 105 causes the data supply unit 102 to stop processing for supplying audio data to the buffer 103, and sends a notification to the data supply control mode controller 106. The data supply control mode controller 106 receives the notification from the data supply control unit 105, and causes the data supply control unit 105 to move to the low-power mode (step S203).

When a predetermined reversion condition is satisfied (step S204:YES) after the data supply control unit 105 has moved to the low-power mode, the data supply control mode controller 106 reverts the operation mode of the data supply control unit 105 from the low-power mode to an original mode thereof (step S205).

Note that in the present embodiment, the predetermined reversion condition is that the data supply control mode controller 106 receives a notification from the audio decoder 107 that the audio decoder 107 has decoded audio data of a predetermined data cluster.

On reversion from the low-power mode, the data supply control unit 105 resumes controlling the supply of audio data to the buffer 103 by the data supply unit 102 (steps S205 and S201).

The following describes the above-mentioned processing in detail using the drawings.

Figure 3:
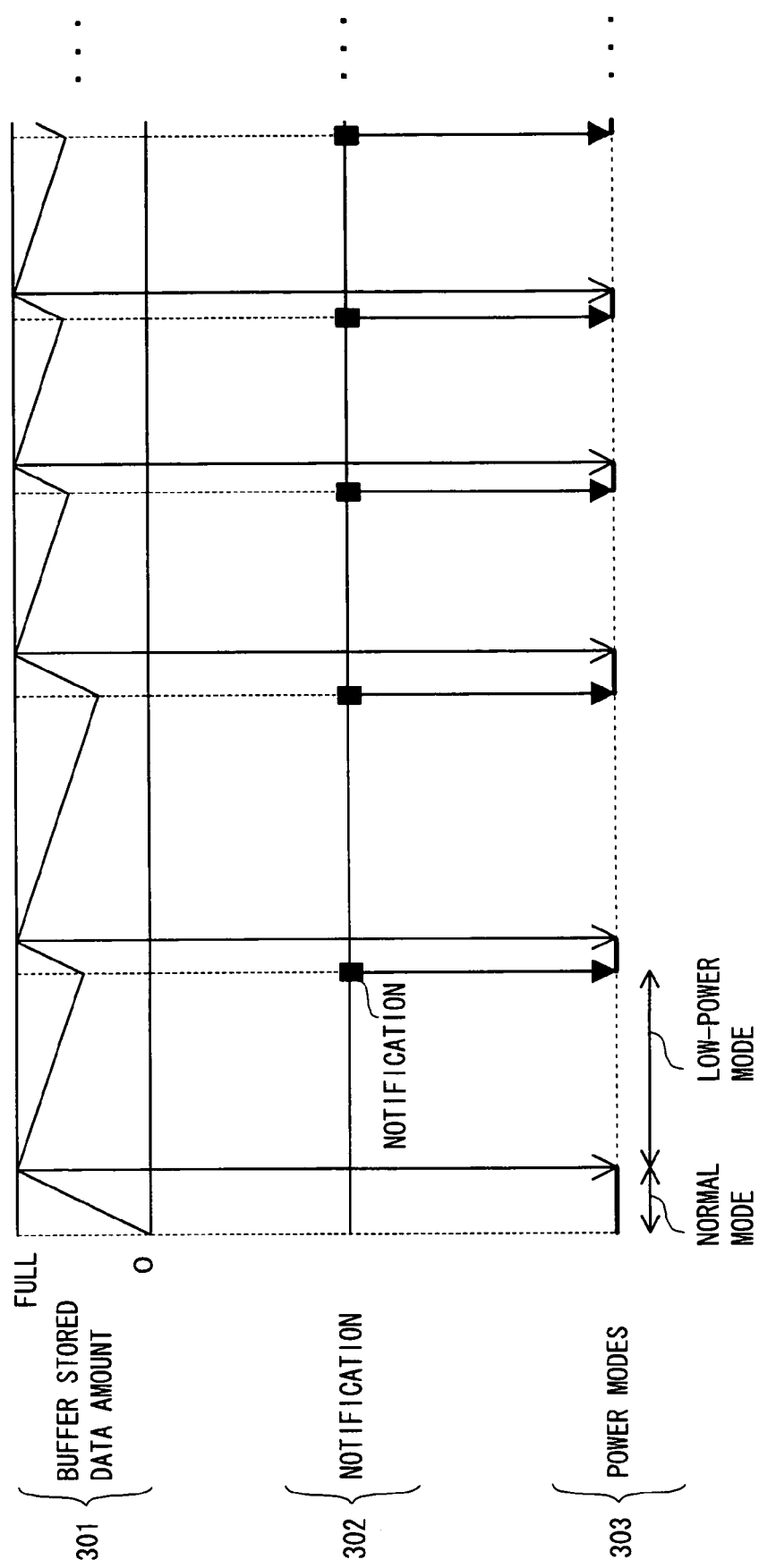
FIG. 3 shows a relationship between data stored in a buffer 103 after commencement of operations by the data processing apparatus 1000, and operation modes of a data supply control unit 105.

FIG. 3 shows a relationship between an amount of data stored in the buffer 103 after operations of the data processing apparatus 1000 have commenced, and operation modes of the data supply control unit 105.

A buffer accumulation amount 301 indicates an amount of data that is stored in the buffer 103. A vertical axis indicates the data amount, and a data amount of "0" indicates that data is not stored in the buffer 103. A data amount of "FULL" indicates that the buffer 103 is full.

A notification 302 indicates when the audio decoder 107 sends a notification to the data supply control mode controller 106.

A power mode 303 indicates whether the operation mode of the data supply control unit 105 is the low-power mode. Note that in FIG. 3, "NORMAL MODE" indicates cases in which the operation mode is not the low-power mode. In FIG. 3, the normal mode is indicated by a solid line, while the low-power mode is indicated by a dotted line.

In FIG. 3, a horizontal axis of the buffer accumulation amount 301 etc. is a time axis. The left end of the horizontal axis is a point at which operations commenced.

As shown in FIG. 3, the data supply control mode controller 106 causes the operation mode of the data supply control unit 105 to move from the normal mode to the low-power mode when the buffer 103 becomes full after the data processing apparatus 1000 has commenced operations in the normal mode. The data supply control unit 105 then operates in the low-power mode until the audio decoder 107 sends a notification to the data supply control mode controller 106. When the notification is made, the data supply control unit 105 reverts to the normal mode.

The same processing is repeated thereafter.

(Summary)

In the above-mentioned embodiment, the audio decoder 107 sends a notification to the data supply control mode controller 106 whenever decoding audio data of a predetermined data cluster. The data supply control mode controller 106 changes the operation mode of the data supply control unit 105 upon receiving the notification from the audio decoder 107.

However, if the data supply control mode controller 106 changes the operation mode according to whether the buffer 103 is full, and not according to whether there has been a notification from the audio decoder 107, that is to say, if the data supply control unit 105 is moved to the low-power mode when the buffer 103 becomes full, and reverted back to the normal mode when data is read from the buffer 103 to free up space therein, then the operation mode will be switched more frequently than in the above-mentioned embodiment. This is because data is consumed in very small units in decoding processing and the like.

As a result, although operations are caused to be performed in the low-power mode to reduce power consumption, frequently switching the operation mode contrarily increases power consumption, and processing performance will drop. This is because in general there is a large overhead since changes to the operation mode to suppress power consumption are accompanied by hardware clock switching and OS (Operating System) status switching.

In the present embodiment, reversion from the low-power mode is performed according to the notification from the audio decoder 107 in order to prevent such a problem.

(Target Performance Management Unit 108)

However, when the data supply control mode controller 106 causes the data supply control unit 105 to move to the low-power mode, then revert from the low-power mode to the normal mode, there may not be a sufficient amount of audio data stored in the buffer 103 for the audio decoder 107 to stably perform decoding processing if the amount of data in the data cluster to be processed by the audio decoder 107 before sending the notification is too large. If the data consumption speed of the audio decoder 107 is relatively high, there is an increased possibility of a buffer underflow when there is not a sufficient amount of stored audio data. A buffer underflow may also occur while the data supply control unit 105 is moving to the low-power mode.

The target performance management unit 108 is included in the present embodiment for this reason. The inclusion of the target performance management unit 108 enables the reduction of power consumption by operating in the low-power mode, while stably executing processing, even if the processing performance required by the data processing apparatus 1000 changes according to various situations.

Specifically, if the data processing apparatus 1000 requires relatively high processing performance, the target performance management unit 108 sets a relatively small data amount for the data cluster to be processed by the audio decoder 107 before sending a notification, so as to avoid a buffer underflow.

On the other hand, given that there is a relatively low possibility of a buffer underflow if the data processing apparatus 1000 requires low processing performance, the target performance management unit 108 sets a relatively large data amount for the data cluster to be processed by the audio decoder 107 before sending a notification.

For example, if the processing performance required by the data processing apparatus 1000 is known in advanced from some sort of management information such as a stream management file, the target performance management unit 108 adjusts the size of the data amount in the data cluster according to this processing performance.

Although described in the above-mentioned embodiment as an audio playback device, the data processing apparatus 1000 may be, for example, a video playback device for playing back video data encoded according to the MPEG (Moving Picture Experts Group) standard or the like. In this exemplary case, the data cluster refers to a collective unit including blocks, frames, GOPs, or the like, and the target performance management unit 108 performs processing such as lowering the number of blocks in a data cluster as the transfer performance for data required by the data processing apparatus 1000 rises. Also, the data cluster is a relatively large amount of data, such as 128 bits.

Note that instantaneous required transfer performance is not specified in the MPEG standard, but rather, the MPEG standard specifies a required transfer performance for the data processing apparatus 1000, including a capacity of an intermediate buffer and the like. The above-mentioned required processing performance may include parameters specifying the required transfer speed for the data processing apparatus 1000.

(Realization by a Program)

The above-mentioned processing may be performed by a computer program.

For example, the processing for supplying data to the buffer 103 may be performed by a computer program.

Specifically, the processing of the data supply unit 102, the remaining amount observing unit 104, the data supply control unit 105 and the data supply control mode controller 106 can be made a single task and implemented on a single processor as software. When power control is performed on a single processor in this way, it is possible to reduce power consumption with respect to buffer control for managing a buffer remaining amount, buffer supply control for supplying data to the buffer 103, as well as operation mode control.

The present invention is therefore particularly effective when implemented by software.

1.3 Variations of Reversion Conditions

In the exemplary case of the first embodiment, the reversion condition that must be satisfied for the data supply control unit 105 to revert from the low-power mode is that the data supply control mode controller 106 receives a notification from the audio decoder 107. The reversion condition, however, is not limited to this example.

The following describes other exemplary reversion conditions.

1.3.1 Operation Mode Control According to a Stored Data Amount of the Buffer

For example, the reversion condition may be that the amount of data stored in the buffer falls below a predetermined lower threshold after the buffer 103 has become full and the data supply control mode controller 106 has caused the data supply control unit 105 to move into the low-power mode. Here, a value of the lower threshold is a stored data amount that is smaller than the amount of data stored in the buffer 103 when the data supply control unit 105 causes the data supply unit 102 to stop supplying data to the buffer 103.

Figure 4:
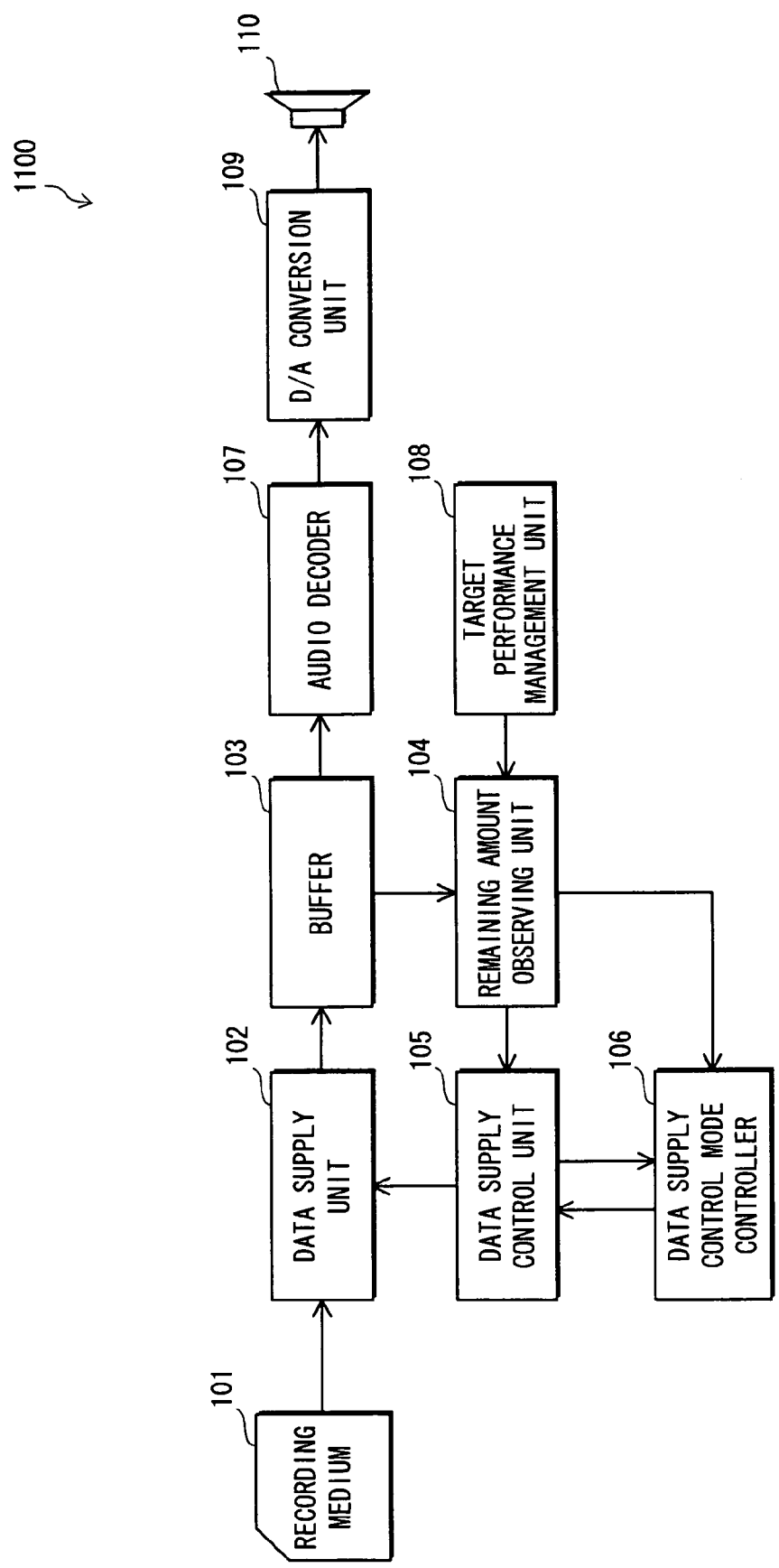
FIG. 4 is a functional block diagram showing a data processing apparatus 1100 in a case of controlling operation modes according to a stored data amount of a buffer.

FIG. 4 is a functional block diagram of a data processing apparatus in this case. In the exemplary case of a data processing apparatus 1100 in FIG. 4, points differing from the first embodiment are that it is the remaining amount observing unit 104 that sends a notification to the data supply control mode controller 106, the remaining amount observing unit 104 stores the lower threshold, and the target performance management unit 108 sets the lower threshold of the remaining amount observing unit 104 according to a processing performance required by the data processing apparatus 1100.

The above processing can be realized since the remaining amount observing unit 104 monitors the amount of data stored in the buffer 103 and notifies the data supply control mode controller 106 when the monitored stored data amount falls below the predetermined lower threshold.

Figure 5:
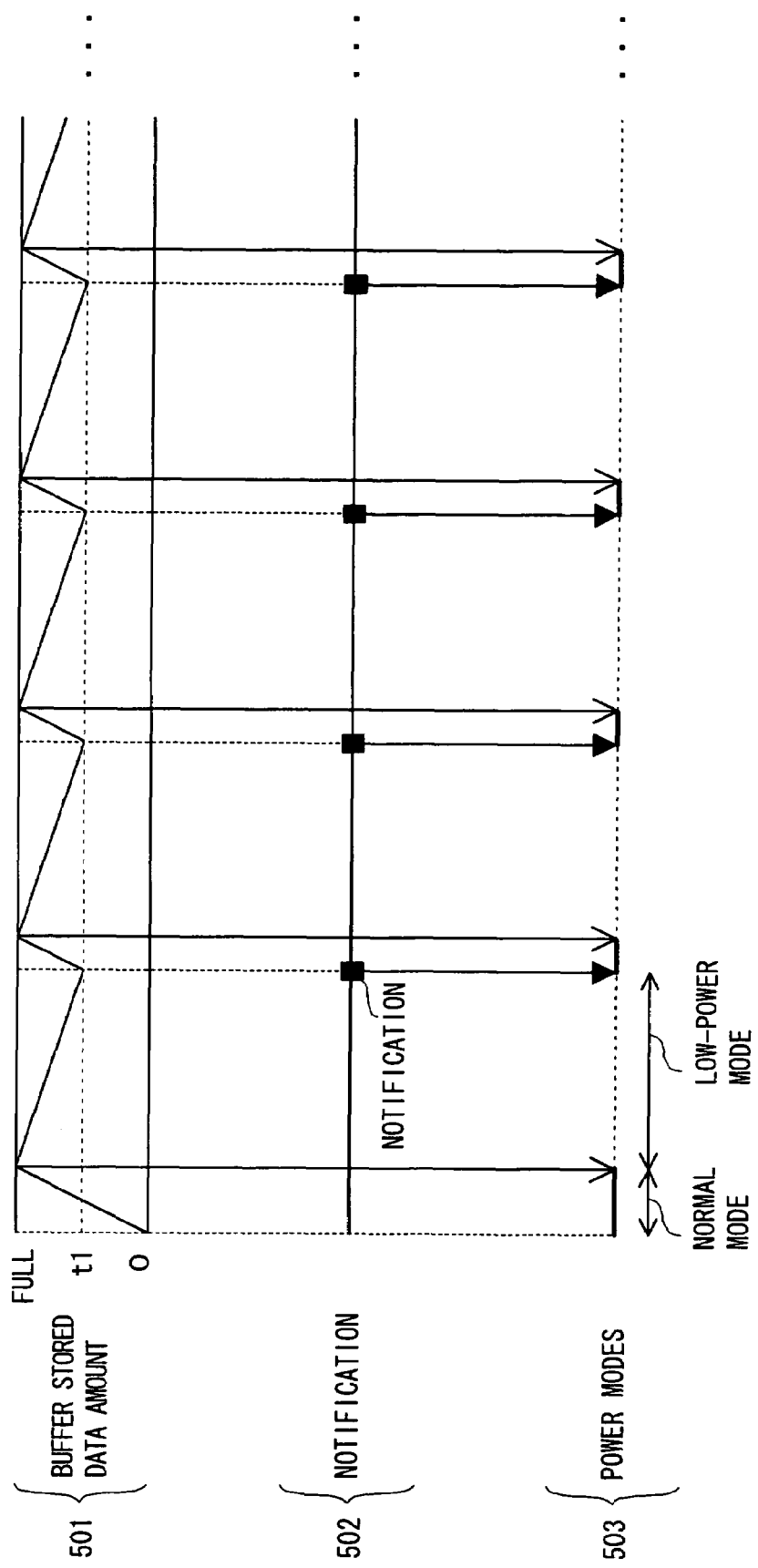
FIG. 5 shows processing of the data processing apparatus 1100.

FIG. 5 shows processing of the data processing apparatus 1100 in the case of the above reversion condition.

Similarly to the buffer accumulation amount 301 in FIG. 3, a buffer accumulation amount 501 in FIG. 5 indicates an amount of data stored in the buffer 103. Details of the buffer accumulation amount 501 are the same as with the buffer accumulation amount 301. Note that "t1" in FIG. 5 indicates the lower threshold.

A notification 502 indicates the notification sent from the remaining amount observing unit 104 to the data supply control mode controller 106 when the amount of data stored in the buffer 103 falls below the predetermined lower threshold (t1).

Power modes 503 are the same as the power modes 303 in FIG. 3, and descriptions thereof are omitted.

As shown in FIG. 5, the data processing apparatus 1100 causes the data supply control unit 105 to move to the low-power mode each time the amount of data stored in the buffer 103 falls below the predetermined lower threshold, and thereafter reverts the data supply control unit 105 to the normal mode when the remaining amount observing unit 104 sends a notification to the data supply control mode controller 106.

Note that similarly to the first embodiment, if the processing performance required by the data processing apparatus 1100 is known from some kind of management information or the like, the target performance management unit 108 sets the lower threshold using the management information. This enables the maintenance of the processing performance required by the data processing apparatus 1100, while keeping loss from switching power modes to a minimum.

The smaller the lower threshold is, the less amount of data there will be stored in the buffer 103 when the data supply control unit 105 reverts from the low-power mode. The target performance management unit 108 therefore, for example, adjusts the lower threshold to be larger as the processing performance required by the data processing apparatus 1100 increases.

Figure 6:
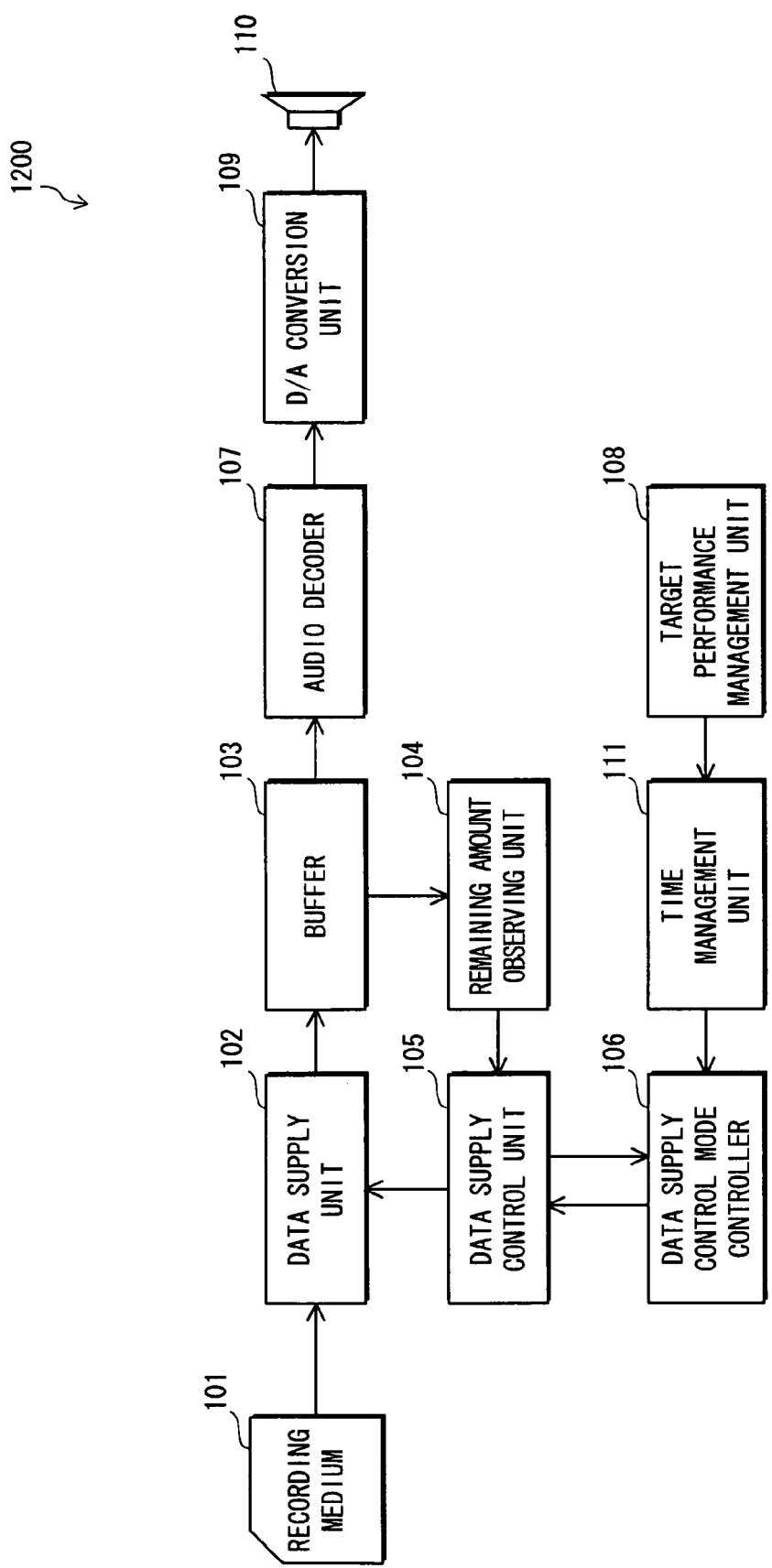
FIG. 6 is a functional block diagram showing a data processing apparatus 1200 in a case of controlling operation modes according to elapsed time after changing operation modes.

1.3.2 Operation Mode Control According to Elapsed Time After an Operation Mode Change As another example, the above-mentioned reversion condition may be, for example, that a predetermined time period has elapsed after the data supply control mode controller 106 caused the data supply control unit 105 to move to the low-power mode. FIG. 6 is a functional block diagram of a data processing apparatus in this case. In the exemplary case of a data processing apparatus 1200 in FIG. 6, points differing from the first embodiment are that there is provided a time management unit 111, and the target performance management unit 108 controls setting of the predetermined time period of the time management unit 111 according to the processing performance required by the data processing apparatus 1200.

Also, after causing the data supply control unit 105 to move to the low-power mode, the data supply control mode controller 106 of this exemplary case sends a notification to the time management unit 111.

The time management unit 111 is, for example, a counter, and commences counting time upon receiving the notification from the data supply control mode controller 106. Upon counting the predetermined time period from receipt of the notification, the time management unit 111 sends a predetermined notification to the data supply control mode controller 106.

Upon receiving the notification from the time management unit 111, the data supply control mode controller 106 reverts the operation mode of the data supply control unit 105 that is operating in the low-power mode.

Figure 7:
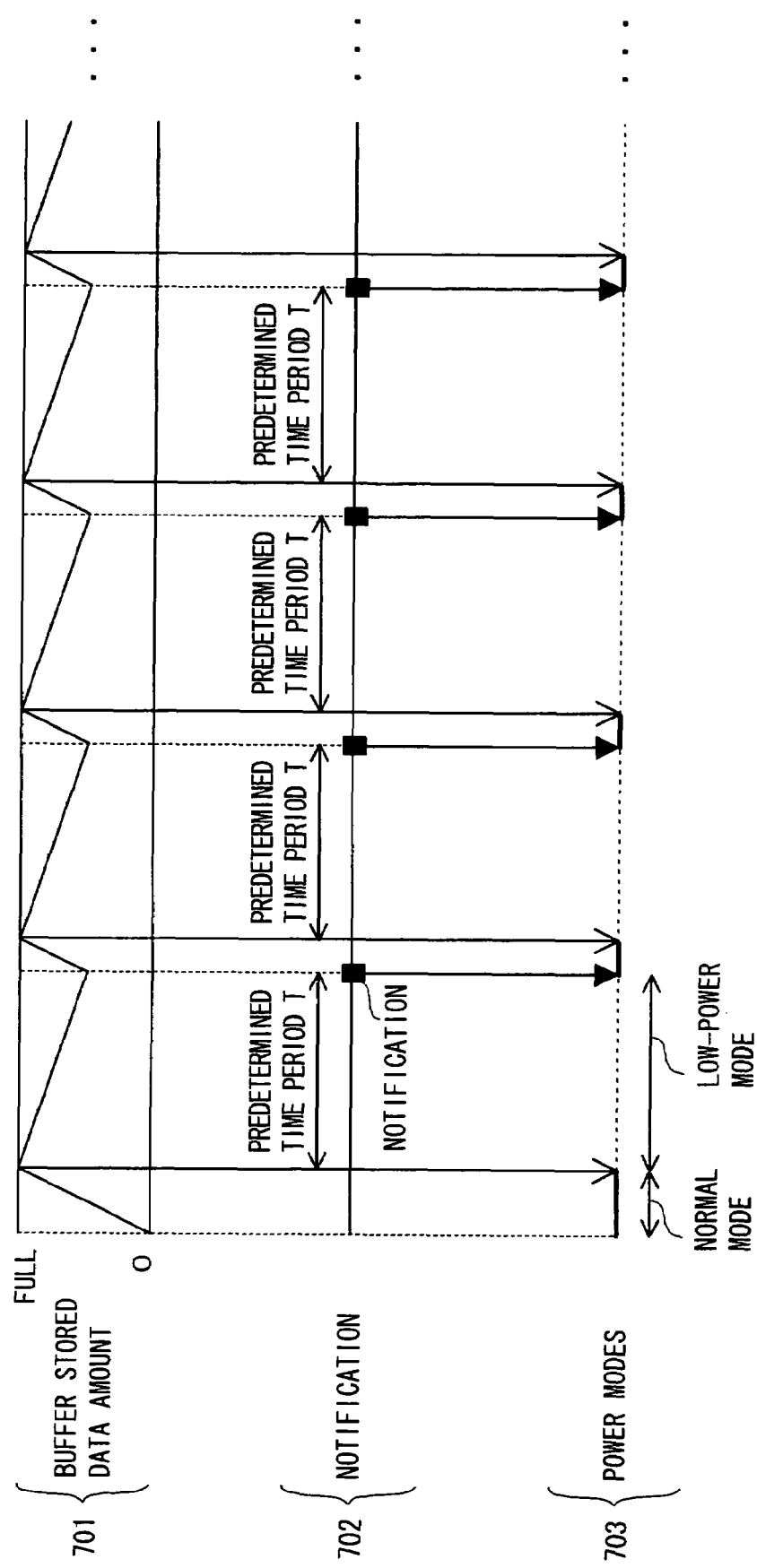
FIG. 7 shows processing of the data processing apparatus 1200.

FIG. 7 shows operations of the data processing apparatus 1200 in this example.

A buffer accumulation amount 701 is the same as the buffer accumulation amount 301 of FIG. 3, and a description thereof is omitted.

A notification 702 indicates a point at which the notification is sent by the time management unit 111 after the data supply control mode controller 106 has caused the data supply control unit 105 to move to the low-power mode. As shown in FIG. 7, the time management unit 111 sends the notification to the data supply control mode controller 106 when the predetermined time period (T) has elapsed after the data supply control unit 105 has moved to the low-power mode due to the buffer 103 becoming full.

Power modes 703 are the same as the power modes 303 of FIG. 3, and descriptions thereof are omitted.

By setting the reversion condition to be that the time management unit 111 has counted the predetermined time, the data processing apparatus 1200 can perform operation mode control without frequently switching operation modes.

Also, similarly to the above-mentioned first embodiment, if the processing performance required by the data processing apparatus 1200 is known from some kind of management information or the like, the target performance management unit 108 uses the management information to adjust a length of the predetermined time period counted by the time management unit 111.

The longer the predetermined time period is, the less amount of data there will be stored in the buffer 103 when the data supply control unit 105 reverts from the low-power mode. The target performance management unit 108 therefore, for example, adjusts the predetermined time period to be shorter as the processing performance required by the data processing apparatus 1200 increases.

1.3.3 Operation Mode Control According to a Cyclically Occurring Event

Figure 8:
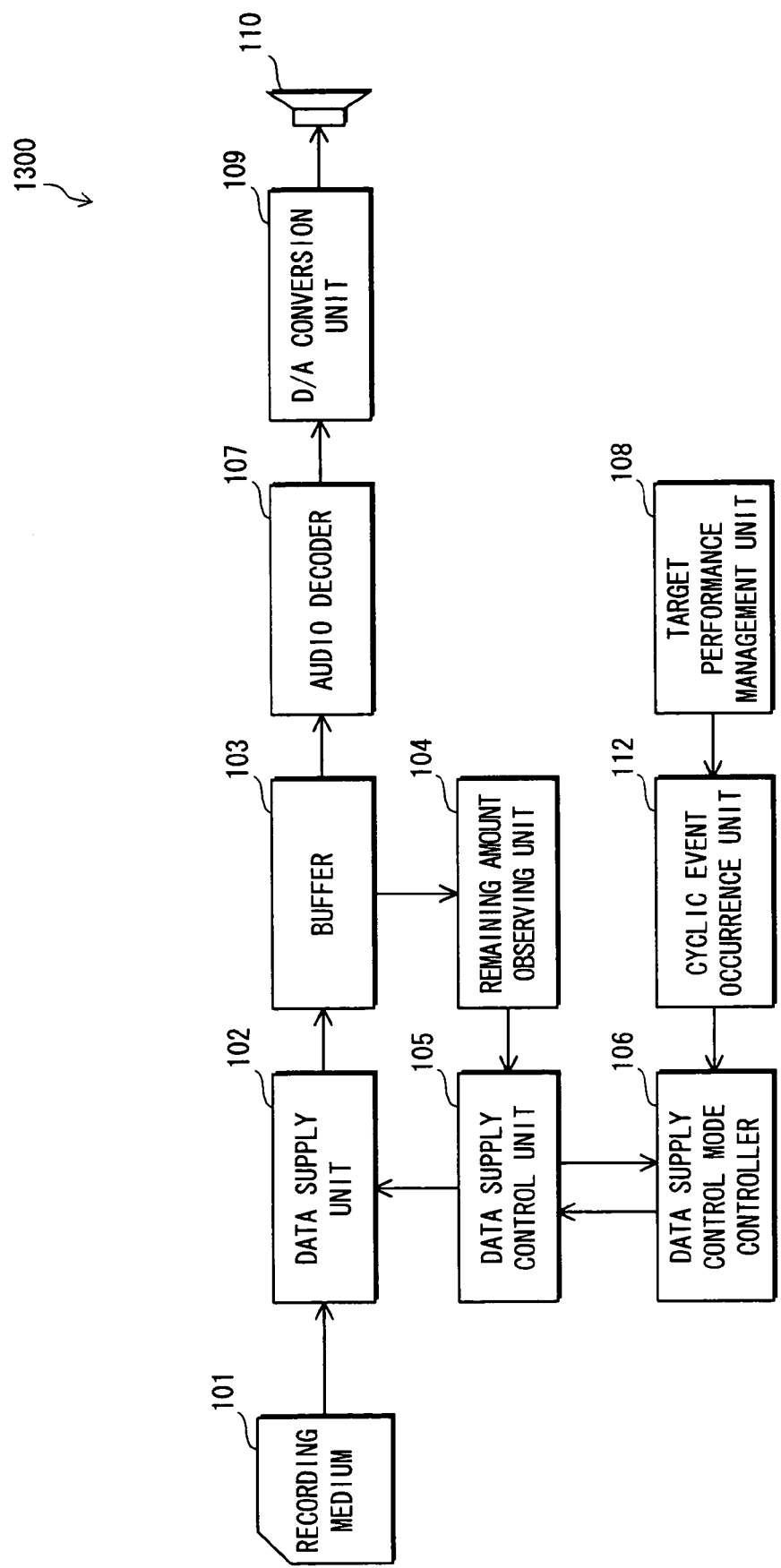
FIG. 8 is a functional block diagram showing a data processing apparatus 1300 in a case of controlling operation modes according to cyclically occurring events.

As another example, the data processing apparatus may include a cyclic event occurrence unit that cyclically sends a notification regarding an event occurrence, and the above-mentioned reversion condition may be, for example, that the cyclic event occurrence unit sends the notification. FIG. 8 is a functional block diagram showing a data processing apparatus in this case. In the exemplary case of a data processing apparatus 1300 in FIG. 8, points differing from the first embodiment are that there is provided a cyclic event occurrence unit 112, and the target performance management unit 108 controls an event occurrence cycle of the cyclic event occurrence unit 112 according to a processing performance required by the data processing apparatus 1300.

The cyclic event occurrence unit 112 is, for example, a cycle handler, and cyclically sends a notification to the data supply control mode controller 106.

Upon receiving the notification from the cyclic event occurrence unit 112, the data supply control mode controller 106 reverts the operation mode of the data supply control unit 105 that is operating in the low-power mode.

Figure 9:
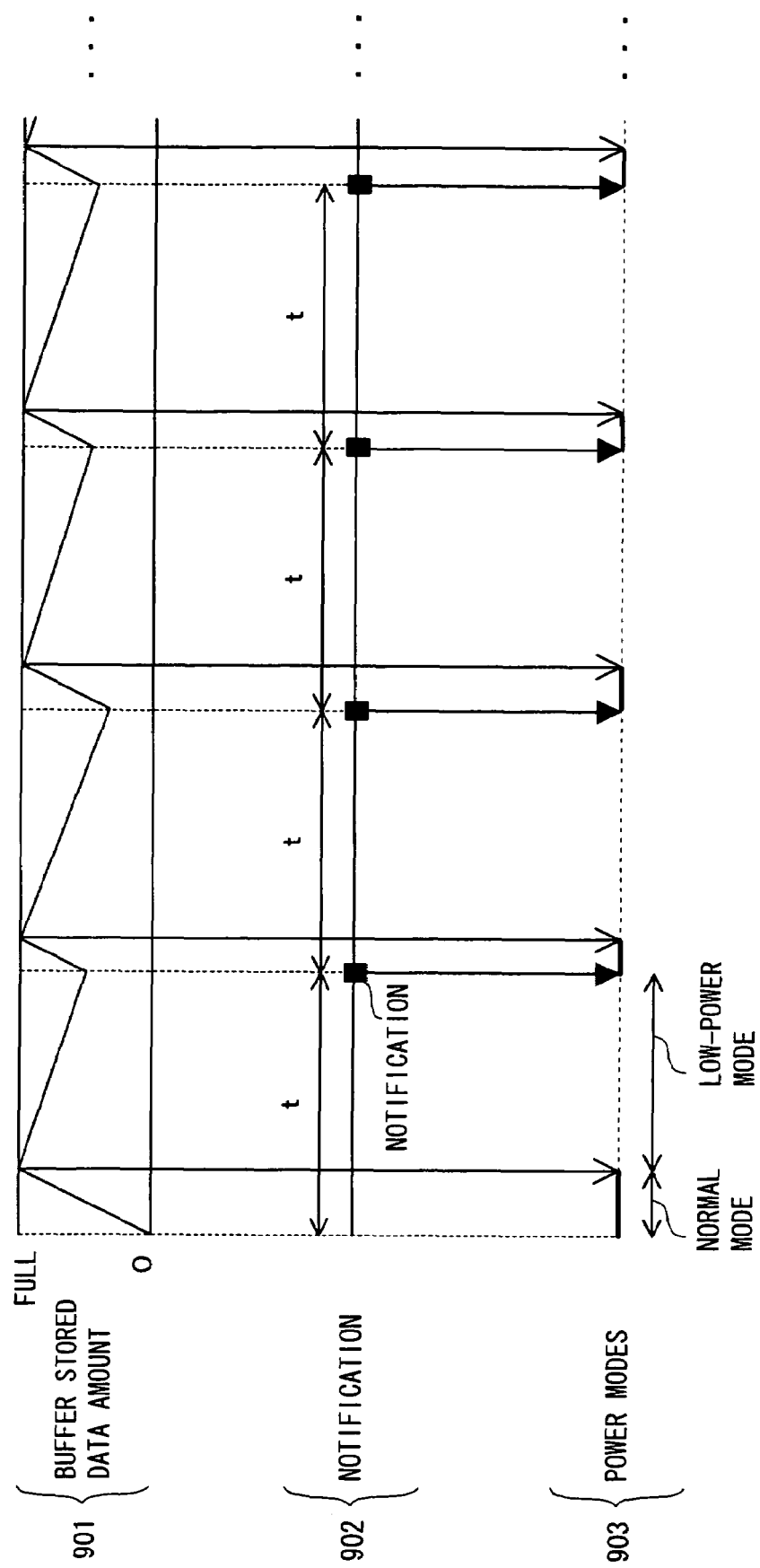
FIG. 9 shows processing of the data processing apparatus 1300.

FIG. 9 shows operations of the data processing apparatus 1300 in the case of this reversion condition.

A buffer accumulation amount 901 shown in FIG. 9 is the same as the buffer accumulation amount 301 of FIG. 3, and a description thereof is omitted.

A notification 902 indicates a notification cyclically sent from the cyclic event occurrence unit 112 to the data supply control mode controller 106 at a predetermined cycle (t).

Power modes 903 are the same as the power modes 303 of FIG. 3, and descriptions thereof are omitted.

As shown in FIG. 9, the data supply control mode controller 106 causes the data supply control unit 105 to move to the low-power mode, and thereafter reverts the operation mode of the data supply control unit 105 upon receiving the cyclically sent notification from the cyclic event occurrence unit 112.

Note that similarly to the above-mentioned first embodiment, if the processing performance required by the data processing apparatus 1300 is known from some kind of management information or the like, the target performance management unit 108 uses the management information to adjust the cycle of the event occurrence notification that is cyclically sent by the cyclic event occurrence unit 112.

The longer the cycle is, the less amount of data there will be stored in the buffer 103 when the data supply control unit 105 reverts from the low-power mode. The target performance management unit 108 therefore, for example, adjusts the cycle to be shorter as the processing performance required by the data processing apparatus 1300 increases.

1.4 A Plurality of Low-Power Modes

In the data processing apparatus of the present invention, the data supply control unit 105 may include a plurality of low-power modes. Here, the loss of time during reversion from the low-power mode to the normal mode increases as power consumption during the low-power mode decreases.

Figure 10:
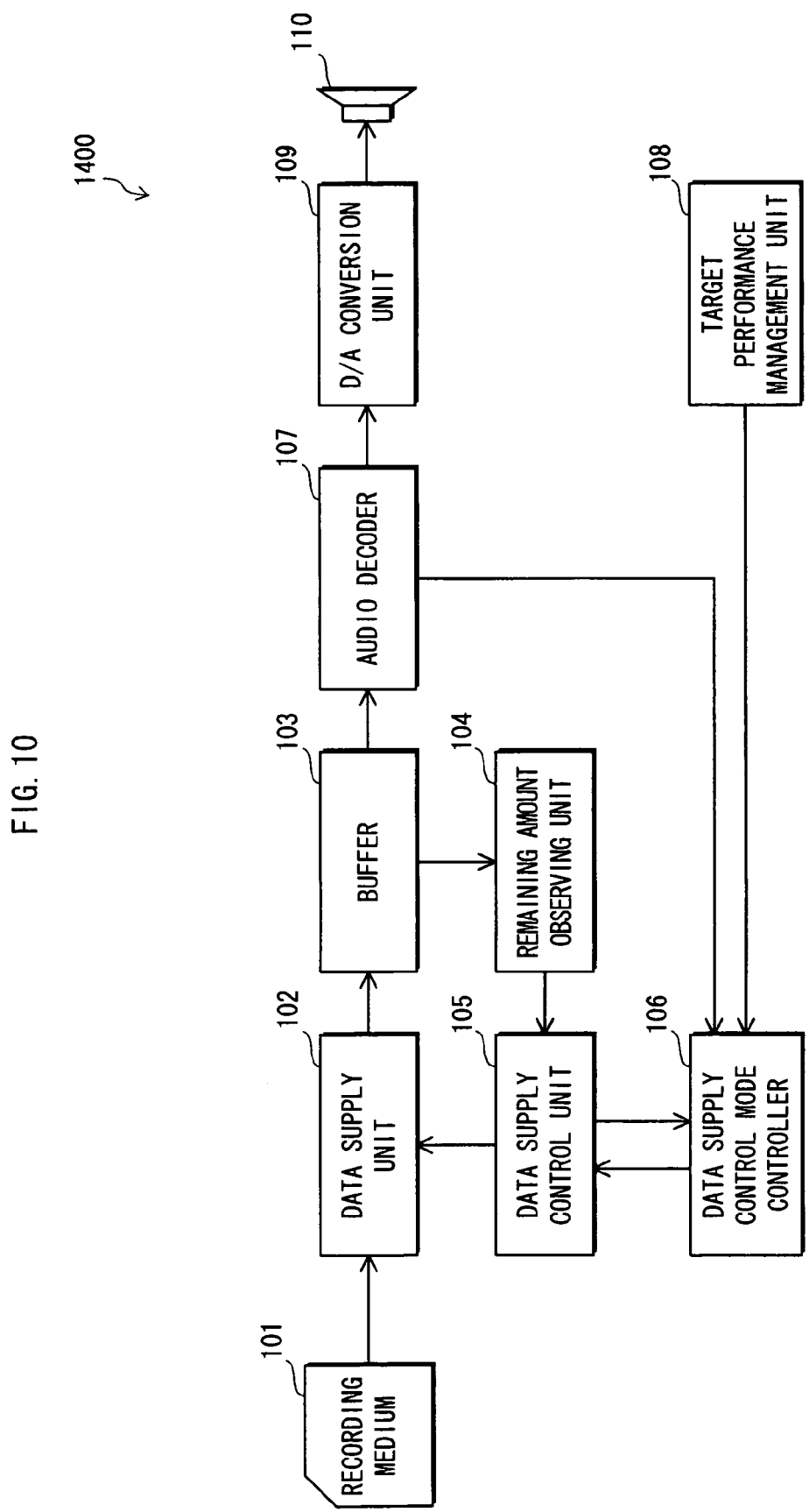
FIG. 10 is a functional block diagram showing a data processing apparatus 1400 in a case of having a plurality of low-power modes.

FIG. 10 is a functional block diagram showing a data processing apparatus 1400 having such a structure.

The target performance management unit 108 notifies, to the data supply control mode controller 106, information regarding a processing performance required by the data processing apparatus 1400.

The data supply control mode controller 106 selects an appropriate one of the plurality of low-power modes, based on the information notified from the target performance management unit 108. Specifically, a relatively small amount of data is consumed by the audio decoder 107 in the predetermined time if the audio data decoded by the data processing apparatus 1400 has a relatively low bitrate. The data supply control mode controller 106 therefore selects a low-power mode with lower power consumption and a longer reversion time. On the other hand, a relatively large amount of data is consumed by the audio decoder 107 in the predetermined time if the audio data decoded by the data processing apparatus 1400 has a relatively high bitrate. In this case, the data supply control mode controller 106 therefore selects a low-power mode with a short time for reversion.

Here, the data supply control mode controller 106 causes the data supply control unit 105 to move to the selected low-power mode.

Note that the inclusion of the plurality of low-power modes may involve the data supply control unit 105 having a plurality of circuit blocks, and the data supply control mode controller 106 selecting whether to stop only a circuit block that has a short reversion time, or stop circuit blocks that have a long reversion time as well. Alternatively, the data supply control mode controller 106 may select whether to put the processor in normal sleep mode or deep sleep mode.

Second Embodiment

The following describes a different embodiment of the data processing apparatus of the present invention.

After the buffer 103 becomes full in the following embodiment, a task execution right is transferred from a data supply control task that controls processing for supplying data to the buffer 103 to another task, based on an amount of data that is stored in the buffer 103.

2.1 Structure

Figure 11:
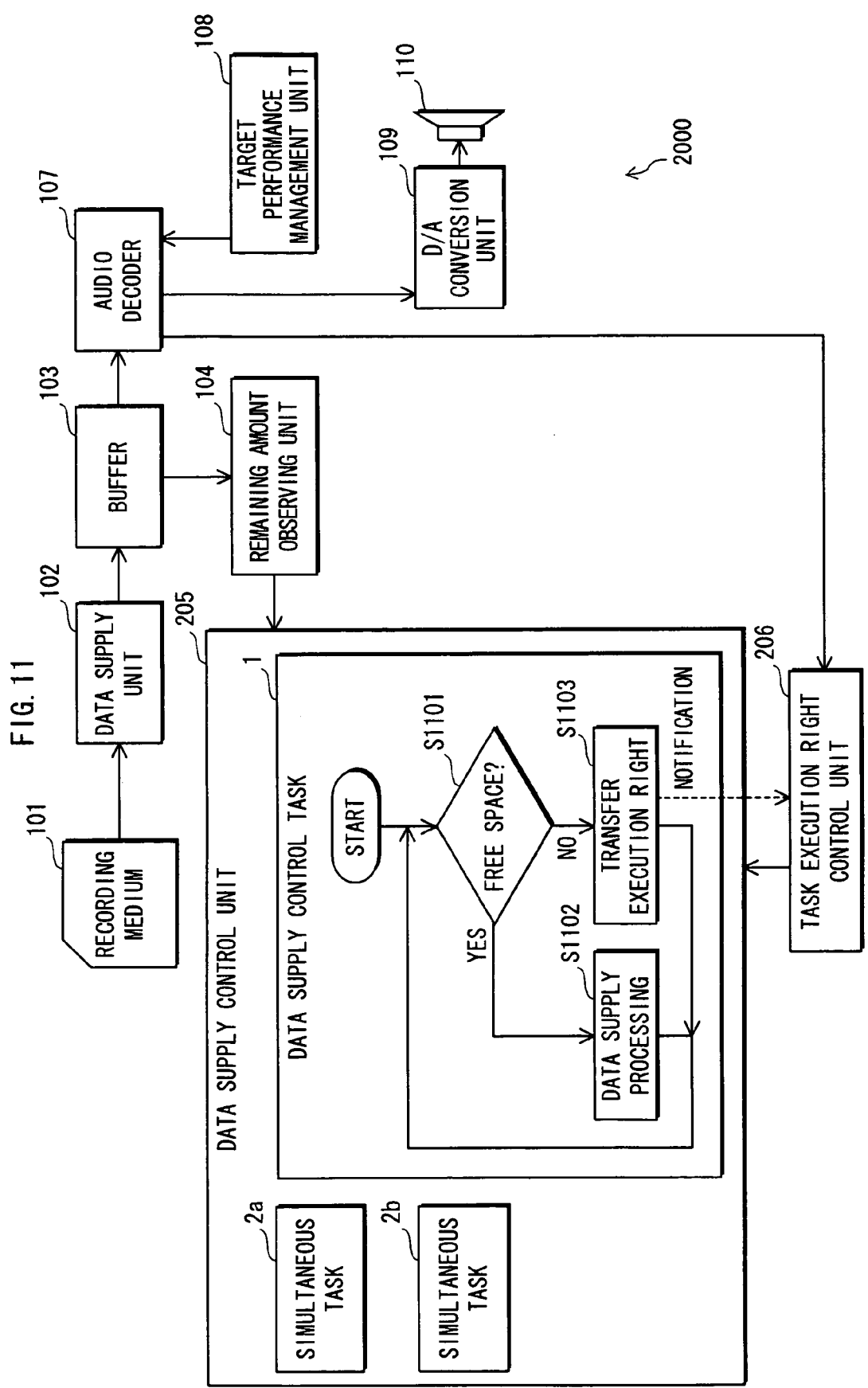
FIG. 11 shows a structure of a data processing apparatus 2000 pertaining to the second embodiment, and data supply control task processing.

FIG. 11 shows a structure of a data processing apparatus 2000 pertaining to the second embodiment of the present invention, and processing of the data supply control task. Note that structural elements that are the same as in the data processing apparatus 1000 have been given the same numbers, and descriptions thereof are omitted.

The following description focuses on differences from the data processing apparatus 1000 pertaining to the first embodiment.

A data supply control unit 205 controls the execution of tasks by switching between a data supply control task 1 and one or more simultaneous tasks 2 (simultaneous task 2a, simultaneous task 2b, . . . ) for processing other than for controlling the supply of data to the buffer 103.

A task execution right control unit 206 controls execution rights for tasks executed in the data supply control unit 205. The task execution right control unit 206 also receives a notification from the audio decoder 107, and controls task execution rights according to the received notification.

Similarly to the first embodiment, the audio decoder 107 sends a notification at each instance of decoding audio data in a predetermined data cluster. In the second embodiment, however, the audio decoder 107 sends the notification to the task execution right control unit 206.

2.2 Operations

Next is a description of operations of the data processing apparatus 2000.

While there is free space in the buffer 103 (step S1101: YES), the data supply control unit 205 continues to execute the data supply control task 1 for controlling the data supply unit 102 to supply data to the buffer 103 (step S1102, step S1101).

When the buffer 103 becomes full (step S1101:NO), the data supply control task 1 sends a notification to the task execution right control unit 206 regarding the transfer of the task execution right (step S1103).

On receipt of the notification regarding the transfer of the task execution right from the data supply control task 1, the task execution right control unit 206 transfers the task execution right from the data supply control task 1 in the data supply control unit 205 to one of the simultaneous tasks 2, as well as controls the execution rights of tasks executed in the data supply control unit 205 such that the data supply control task 1 is not executed.

When a notification is received from the audio decoder 107 after having transferred the task execution right to one of the simultaneous tasks, the task execution right control unit 206 controls the execution rights of tasks in the data supply control unit 205 such that the data supply control task 1 is executed.

(Summary)

Whereas processing time for repeatedly judging whether the buffer 103 is full is needlessly spent in conventional processors, the above operations enable this processing time to be allocated to the execution of simultaneous tasks, and enable an improvement in the overall operating efficiency of the data processing apparatus.

Furthermore, if for example the execution of the simultaneous tasks enters a wait state or if the execution is completed, or if the simultaneous tasks release their task execution right, power consumption may be suppressed by causing the data supply control unit 205 to move to a low-power state in which clocks are stopped. Here, the low-power mode is when the data processing apparatus operates while suppressing power consumption, and normal mode is when the data processing apparatus operates without suppressing power consumption.

FIG. 12 shows transitions of tasks executed by the data supply control unit 205 in the present embodiment.

FIG. 12 shows an exemplary case of using a round-robin method of task control to cyclically switch the task execution rights.

A description of a buffer accumulation amount 1201 is omitted since it is the same as the buffer accumulation amount 301 of FIG. 3.

A notification 1202 indicates timing of the notification from the audio decoder 107 to the task execution right control unit 206.

Power modes 1203 indicate whether the data supply control unit 205 is in the low-power mode or the normal mode. In FIG. 12, the normal mode is indicated by a solid line, while the low-power mode is indicated by a dotted line.

Execution tasks 1204 indicate tasks being executed in the data supply control unit 205. In FIG. 12, "TA1" indicates the data supply control task 1, and "TA2" indicates the simultaneous tasks 2.

In FIG. 12, a horizontal axis of the buffer accumulation amount 1201 etc. is a time axis. The left end of the horizontal axis is a point at which operations commenced.

As shown in FIG. 12, after commencing operations in the normal mode, the data processing apparatus 2000 performs processing by using a round-robin method to switch the task execution rights of the data supply control task 1 in the data supply control unit 205 and the simultaneous tasks 2.

When the buffer 103 becomes full, the data supply control task 1 sends a notification to the task execution right control unit 206 regarding the transfer of task execution rights.

On receipt of the notification from the data supply control task 1, the task execution right control unit 206 transfers the task execution right from the data supply control task 1 to one of the simultaneous tasks 2, as well as controls the execution rights of tasks to be executed such that the data supply control task 1 is not executed.

While the task execution right control unit 206 is controlling task execution rights such that the data supply control task 1 is not executed, the simultaneous tasks 2 are executed in the data supply control unit 205. Here, the data processing apparatus 2000 causes the data supply control unit 205 to move to the low-power mode if all of the simultaneous tasks 2 have finished being executed in the data supply control unit 205, or if the simultaneous tasks 2 have released their execution rights.

Thereafter, the data processing apparatus 2000 reverts the operation mode of the data supply control unit 205 from the low-power mode to the normal mode when the notification is sent from the audio decoder 107 to the task execution right control unit 206, and the task execution right control unit 206 controls task execution rights such that the data supply control task 1 is executed in the data supply control unit 205. Note that reversion of the operation mode to the normal mode is not limited to if the audio decoder 107 has sent the notification. Alternatively, this reversion to the normal mode may be performed if any of the tasks becomes executable due to a processing resumption event for the simultaneous tasks.

(Variations)

Although the data processing apparatus 2000 is described in the above example as using a round-robin method to execute tasks, and after the buffer 103 has become full, causing the task execution control unit 206 to transfer task execution rights from the data supply control task 1 to the simultaneous tasks 2, the data processing apparatus 2000 is not limited to this. The data supply control task 1 may release its task execution right when the buffer 103 becomes full, and the data supply control unit 205 may be moved to the low-power mode without executing any of the tasks during the time allocated to the data supply control task 1 in the task switching cycle.

This prevents the simultaneous tasks 2 from being excessively processed, and ensures the steady operation of the data processing apparatus 2000.

FIG. 13 shows operations of the data processing apparatus 2000 in such a case.

In FIG. 13, execution tasks 1204 indicate conditions of tasks being executed by the round-robin method in predetermined cycles (Tr).

As shown in FIG. 13, the data supply control unit 205 moves to the low-power mode in the execution time allocated to the data supply control task 1 in the task switching cycle, when the buffer becomes full and the data supply control task 1 in the data supply control unit 205 releases its execution right. The data supply control unit 205 operates in the normal mode during the execution time allocated to the simultaneous tasks 2.

Thereafter, when the notification from the audio decoder 107 has been received, the data processing apparatus 2000 reverts the operation mode of the data supply control unit 205 to the normal mode for the execution time of the data supply control task 1, and resumes execution of the data supply control task 1.

Note that although the data processing apparatus 2000 resumes the execution of the data supply control task 1 upon receiving the notification from the audio decoder 107 in the second embodiment, the condition for resuming execution of the data supply control task 1 is not limited to this. The exemplary reversion conditions described in the first embodiment may be used as the resumption condition.

Supplementary Remarks

Although described above in detail, a data processing apparatus of the present invention is not limited to the above-mentioned examples. Variations such as the following are also applicable.

(1) Although the data supply control unit 105 causes the data supply unit 102 to stop supplying data to the buffer 103 when the amount of data stored in the buffer 103 reaches a maximum, stopping the supply of data is not necessarily limited to this. The supply of data may be stopped when the stored data amount of the buffer 103 reaches another amount.

(2) Although a data processing apparatus that simply supplies data to a buffer and reads the data from the buffer to perform processing is described in the above-embodiments, the present invention is not limited to this. A plurality of data pieces may be multiplexed in a single piece of input data, and the present invention may be an apparatus that demultiplexes the input data into the data pieces, store the demultiplexed data pieces in a plurality of intermediate buffers, and performs processing on the demultiplexed data pieces. Here, an amount of data to be sent to the buffers may be determined according to an amount of input data in the intermediate buffers. The multiplexed data may include any one or a combination of, for example, audio, video, voice, subtitle, or text information.

(3) The devices of the above mentioned embodiments and variations may be computer systems structured specifically from a microprocessor, ROM, RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes since the computer program achieves predetermined functions.

(4) A portion or all of the structure elements of the devices of the aforementioned embodiments and variations may be structured as a single system LSI (Large Scale Integration). A system LSI is a super multifunctional LSI manufactured by integrating multiple structural units onto a single chip. Specifically, it is a computer system including a microprocessor, ROM, and RAM. A computer program is stored in the RAM. The system LSI achieves its functions as the microprocessor operates in accordance with the computer program.

(5) A portion or all of the structure elements of the devices of the above mentioned embodiments and variations may be structured as a removable IC card or stand-alone module. The IC card or the module would be a computer system including a microprocessor, ROM, and RAM. The IC card and the module may also include the above super multifunctional LSI. The IC card and the module achieve their functions as the microprocessor operates in accordance with the computer program. This IC card or module may be tamper resistant.

(6) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network acting as an internet, a data broadcast, etc.

Also, the present invention may be a computer system including a microprocessor and a memory, whereby the memory stores the computer program, and the microprocessor operates in accordance with the computer program.

Also, the present invention may be carried out by another independent computer system by transferring the program or the digital signals which have been recorded on the recording media, or by transferring the program or the digital signals via the network, etc.

(7) The above embodiments and the above variations may be combined.

(8) The present invention can also be used as software or hardware in various devices in which the transfer and consumption of data is accompanied by the consumption of power, and in particular, in portable devices that require power-saving, such as mobile phones, portable audio players, and camcorders.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data processing apparatus comprising:
a buffer;
a data supply unit operable to supply data to the buffer;
a processing execution unit operable to read the data from the buffer and execute processing;
a buffer management unit operable to manage a stored data amount of the buffer;
a supply control unit having a normal mode and a low-power mode as operation modes, and operable to:
during the normal mode, control the data supply unit to supply the data to the buffer, according to the stored data amount of the buffer, and
restrict the control during the low-power mode; and
a power control unit operable to:
move the supply control unit from the normal mode to the low-power mode when the stored data amount of the buffer reaches a predetermined threshold, and
after performing the move, revert the supply control unit from the low-power mode to the normal mode when a predetermined reversion condition is satisfied,
wherein the predetermined reversion condition is that the processing execution unit executes processing with respect to data in a predetermined data cluster.

2. The data processing apparatus of claim 1, further comprising:
a target performance management unit operable to manage a processing capacity to be achieved by the processing execution unit, and control an amount of the data in the predetermined data cluster according to the processing capacity.

3. A data processing apparatus comprising:
a buffer;
a data supply unit operable to supply data to the buffer;
a processing execution unit operable to read the data from the buffer and execute processing;
a buffer management unit operable to manage a stored data amount of the buffer;
a supply control unit having a normal mode and a low-power mode as operation modes, and operable to:
during the normal mode, control the data supply unit to supply the data to the buffer, according to the stored data amount of the buffer, and
restrict the control during the low-power mode; and
a power control unit operable to:
move the supply control unit from the normal mode to the low-power mode when the stored data amount of the buffer reaches a predetermined threshold, and
after performing the move, revert the supply control unit from the low-power mode to the normal mode when a predetermined reversion condition is satisfied,
wherein the predetermined reversion condition is that a predetermined time period has elapsed after the power control unit has performed the move.

4. The data processing apparatus of claim 3, further comprising:
a target performance management unit operable to manage a processing capacity to be achieved by the processing execution unit, and control a value of the predetermined time period according to the processing capacity.

5. A data processing apparatus comprising:
a buffer;
a data supply unit operable to supply data to the buffer;
a processing execution unit operable to read the data from the buffer and execute processing;
a buffer management unit operable to manage a stored data amount of the buffer;
a supply control unit having a normal mode and a low-power mode as operation modes, and operable to:
during the normal mode, control the data supply unit to supply the data to the buffer, according to the stored data amount of the buffer, and
restrict the control during the low-power mode; and
a power control unit operable to:
move the supply control unit from the normal mode to the low-power mode when the stored data amount of the buffer reaches a predetermined threshold, and
after performing the move, revert the supply control unit from the low-power mode to the normal mode when a predetermined reversion condition is satisfied,
said data processing apparatus further comprising:
a cyclic event occurrence unit operable to notify an event occurrence at a predetermined cycle,
wherein the predetermined reversion condition is that the cyclic event occurrence unit notifies the event occurrence after the power control unit has performed the move.

6. The data processing apparatus of claim 5, further comprising:
a target performance management unit operable to manage a processing capacity to be achieved by the processing execution unit, and control a length of the predetermined cycle according to the processing capacity.

7. A data processing apparatus comprising:
a buffer;
a data supply unit operable to supply data to the buffer;
a processing execution unit operable to read the data from the buffer and execute processing;
a buffer management unit operable to manage a stored data amount of the buffer;
a supply control unit having a normal mode and a low-power mode as operation modes, and operable to:
during the normal mode, control the data supply unit to supply the data to the buffer, according to the stored data amount of the buffer, and
restrict the control during the low-power mode; and
a power control unit operable to:
move the supply control unit from the normal mode to the low-power mode when the stored data amount of the buffer reaches a predetermined threshold, and
after performing the move, revert the supply control unit from the low-power mode to the normal mode when a predetermined reversion condition is satisfied,
wherein the supply control unit has a plurality of the low-power modes, each having a different power consumption,
the data processing apparatus further comprises a target performance management unit operable to manage a processing capacity to be achieved by the processing execution unit, and
the power control unit includes a selection subunit operable to select one of the plurality of low-power modes according to the processing capacity, and moves the supply control unit to the low-power mode selected by the selection subunit.

8. A data processing apparatus comprising:

a buffer;

a processing execution unit operable to read data from the buffer and execute processing;

a buffer management unit operable to manage a stored data amount of the buffer;

a task execution unit operable to execute one or more tasks including a data supply control task for controlling, according to the stored data amount of the buffer, processing for supplying the data to the buffer; and a task execution right control unit operable to:
  stop execution of the data supply control task when the stored data amount of the buffer reaches a predetermined threshold while the data supply control task has been allocated a task execution right in the task execution unit, and
  after performing the stopping, control allocation of the task execution right such that the execution of the data supply control task is resumed when a predetermined resumption condition is satisfied, wherein:

the task execution right control unit, along with stopping the execution of the data supply control task, transfers the task execution right that was allocated to the data supply control task to a simultaneous task for performing processing other than for supplying the data to the buffer, and after performing the stopping, controls the allocation of the task execution right by allocating the task execution right to the data supply control task when the predetermined resumption condition is satisfied, said data processing apparatus being able to operate in a plurality of operation modes having respectively differing power consumptions, said data processing apparatus further comprising:

a normal mode and a low-power mode as the operation modes; and a power control unit operable to:
  move the data processing apparatus from the normal mode to the low-power mode when none of the one or more tasks to be executed are present in the task execution unit or all of the one or more tasks are in an execution wait state after the task execution right control unit has performed the transfer, and
  after performing the move, revert the data processing apparatus from the low-power mode to the normal mode when the predetermined resumption condition is satisfied.

9. The data processing apparatus of claim 8, wherein the predetermined resumption condition is that any of the one or more tasks becomes executable after the power control unit has performed the move.

10. The data processing apparatus of claim 8, further comprising:

a plurality of the low-power modes, each having a different power consumption; and a target performance management unit operable to manage a processing capacity to be achieved by the processing execution unit, wherein the power control unit includes a selection subunit operable to select one of the plurality of low-power modes according to the processing capacity, and the power control unit moves the data processing apparatus to the low-power mode selected by the selection subunit.

11. A data processing apparatus comprising:

a buffer;

a processing execution unit operable to read data from the buffer and execute processing;

a buffer management unit operable to manage a stored data amount of the buffer;

a task execution unit operable to execute one or more tasks including a data supply control task for controlling, according to the stored data amount of the buffer, processing for supplying the data to the buffer; and a task execution right control unit operable to:
  stop execution of the data supply control task when the stored data amount of the buffer reaches a predetermined threshold while the data supply control task has been allocated a task execution right in the task execution unit, and
  after performing the stopping, control allocation of the task execution right such that the execution of the data supply control task is resumed when a predetermined resumption condition is satisfied, said data processing apparatus being able to operate in a plurality of operation modes having respectively differing power consumptions, and further comprising a normal mode and a low-power mode as the operation modes, wherein the task execution unit allocates the task execution right to the one or more tasks, and executes the one or more tasks by a round-robin method, and the data processing apparatus further comprises a power control unit operable to cause the data processing apparatus to operate in the low-power mode in a time slot of the data supply control task while the execution thereof has been stopped by the task execution right control unit.

12. The data processing apparatus of claim 11, further comprising:

a plurality of the low-power modes, each having a different power consumption; and a target performance management unit operable to manage a processing capacity to be achieved by the processing execution unit, wherein the power control unit includes a selection subunit operable to select one of the plurality of low-power modes according to the processing capacity, and the power control unit causes the data processing apparatus to operate in the low-power mode selected by the selection subunit, in the time slot.

13. A data processing apparatus comprising:

a buffer;

a processing execution unit operable to read data from the buffer and execute processing;

a buffer management unit operable to manage a stored data amount of the buffer;

a task execution unit operable to execute one or more tasks including a data supply control task for controlling, according to the stored data amount of the buffer, processing for supplying the data to the buffer; and a task execution right control unit operable to:
  stop execution of the data supply control task when the stored data amount of the buffer reaches a predetermined threshold while the data supply control task has been allocated a task execution right in the task execution unit, and
  after performing the stopping, control allocation of the task execution right such that the execution of the data supply control task is resumed when a predetermined resumption condition is satisfied.

wherein the predetermined resumption condition is that the processing execution unit executes processing with respect to data in a predetermined data cluster.

14. The data processing apparatus of claim 13, further comprising:
a target performance management unit operable to manage a processing capacity to be achieved by the processing execution unit, and control an amount of the data in the predetermined data cluster according to the processing capacity.

15. A data processing apparatus comprising:
a buffer;
a processing execution unit operable to read data from the buffer and execute processing;
a buffer management unit operable to manage a stored data amount of the buffer;
a task execution unit operable to execute one or more tasks including a data supply control task for controlling, according to the stored data amount of the buffer, processing for supplying the data to the buffer; and
a task execution right control unit operable to:
stop execution of the data supply control task when the stored data amount of the buffer reaches a predetermined threshold while the data supply control task has been allocated a task execution right in the task execution unit, and
after performing the stopping, control allocation of the task execution right such that the execution of the data supply control task is resumed when a predetermined resumption condition is satisfied,
wherein the predetermined resumption condition is that a predetermined time period has elapsed after the task execution right control unit has performed the stopping.

16. The data processing apparatus of claim 15, further comprising:
a target performance management unit operable to manage a processing capacity to be achieved by the processing execution unit, and control a value of the predetermined time period according to the processing capacity.

17. A data processing apparatus comprising:
a buffer;
a processing execution unit operable to read data from the buffer and execute processing;
a buffer management unit operable to manage a stored data amount of the buffer;
a task execution unit operable to execute one or more tasks including a data supply control task for controlling, according to the stored data amount of the buffer, processing for supplying the data to the buffer; and
a task execution right control unit operable to:
stop execution of the data supply control task when the stored data amount of the buffer reaches a predetermined threshold while the data supply control task has been allocated a task execution right in the task execution unit, and
after performing the stopping, control allocation of the task execution right such that the execution of the data supply control task is resumed when a predetermined resumption condition is satisfied,
said data processing apparatus further comprising a cyclic event occurrence unit operable to notify an event occurrence at a predetermined cycle,
wherein the predetermined resumption condition is that the cyclic event occurrence unit notifies the event occurrence after the task execution right control unit has performed the stopping.

18. The data processing apparatus of claim 17, further comprising:
a target performance management unit operable to manage a processing capacity to be achieved by the processing execution unit, and control a length of the predetermined cycle according to the processing capacity.

* * * * *